(12) United States Patent
Ruer

(10) Patent No.: US 8,443,605 B2
(45) Date of Patent: May 21, 2013

(54) INSTALLATION AND METHODS FOR STORING AND METHODS FOR STORING AND RESTORING ELECTRICAL ENERGY USING A PISTON-TYPE GAS COMPRESSION AND EXPANSION UNIT

(75) Inventor: Jacques Ruer, Fourqueux (FR)

(73) Assignee: Saipem S.A., Montigny le Bretonneux (FR)

( * ) Notice: Subject to any disclaimer, the term of this patent is extended or adjusted under 35 U.S.C. 154(b) by 484 days.

(21) Appl. No.: 12/738,530

(22) PCT Filed: Oct. 3, 2008

(86) PCT No.: PCT/FR2008/051794
§ 371 (c)(1),
(2), (4) Date: Apr. 16, 2010

(87) PCT Pub. No.: WO2009/053593
PCT Pub. Date: Apr. 30, 2009

(65) Prior Publication Data
US 2010/0218500 A1    Sep. 2, 2010

(30) Foreign Application Priority Data
Oct. 19, 2007 (FR) .................................... 07 58431

(51) Int. Cl.
*F01K 1/00* (2006.01)
(52) U.S. Cl.
USPC ................. 60/659; 60/645; 60/651; 60/652; 60/670; 60/671
(58) Field of Classification Search
USPC ..................... 60/516–526, 650, 682
See application file for complete search history.

(56) References Cited

U.S. PATENT DOCUMENTS 3,708,979 A * 1/1973 Bush et al. ...................... 60/522
4,094,148 A   6/1978 Nelson
(Continued)

FOREIGN PATENT DOCUMENTS

EP   0003980   10/1981
FR   2781619   1/2000
(Continued)

OTHER PUBLICATIONS

International Search Report dated Apr. 3, 2009.

*Primary Examiner* — Thomas Denion
*Assistant Examiner* — Philip Eklem
(74) *Attorney, Agent, or Firm* — Cozen O'Connor

(57) ABSTRACT

An installation and methods for storing and returning electrical energy. First and second lagged enclosures containing porous refractory material are provided through which a gas is caused to flow by causing the gas to flow through first and second compression/expansion groups interposed in the pipe circuit between the top and bottom ends, respectively, of the first and second enclosures, each compression/expansion group having a piston moved in translation in a cylinder, each group operating in a different mode, either in compression mode or in expansion mode, one of the two compression/expansion groups receiving a gas at a temperature that is higher than the other group, such that in compression mode it is driven by an electric motor that consumes electrical energy for storage $E_1$, and in a thermodynamic engine mode it drives an electricity generator enabling the electrical energy $E_R$ to be returned. The electrical energy is stored in the form of heat within masses of refractory substances, and the stored potential thermal energy is returned in the form of electrical energy.

37 Claims, 9 Drawing Sheets

U.S. PATENT DOCUMENTS

| | | | |
|---|---|---|---|
| 4,353,214 A | | 10/1982 | Gardner |
| 4,397,962 A | * | 8/1983 | Schockmel ................... 501/112 |
| 5,467,600 A | * | 11/1995 | Kuroiwa .............................. 62/6 |
| 6,327,858 B1 | * | 12/2001 | Negre et al. ..................... 60/650 |
| 7,448,213 B2 | * | 11/2008 | Mitani ............................. 60/616 |
| 7,719,127 B2 | * | 5/2010 | Bertolotti ........................ 290/44 |
| 7,723,858 B2 | * | 5/2010 | Nayef et al. ...................... 290/2 |
| 2006/0218924 A1 | | 10/2006 | Mitani |

FOREIGN PATENT DOCUMENTS

| | | |
|---|---|---|
| WO | WO 2006/072185 | 7/2006 |
| WO | WO 2006072185 A1 * | 7/2006 |

* cited by examiner

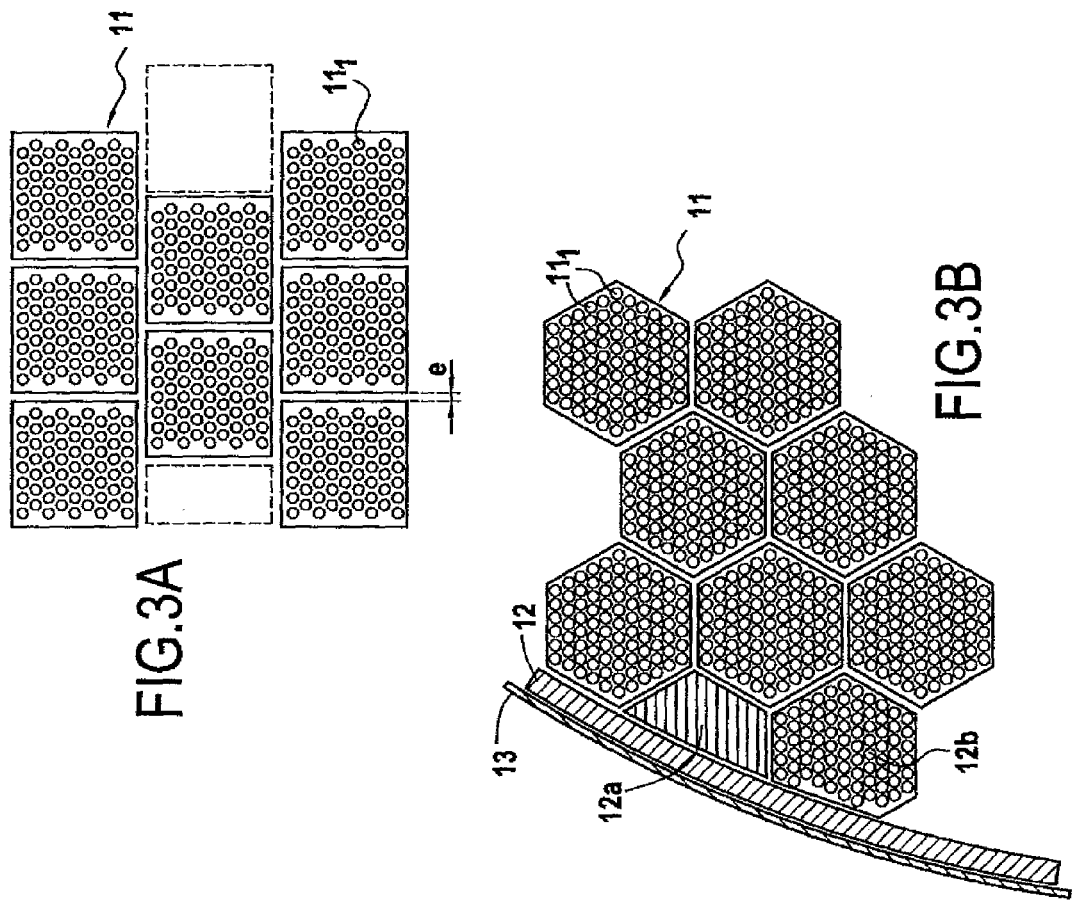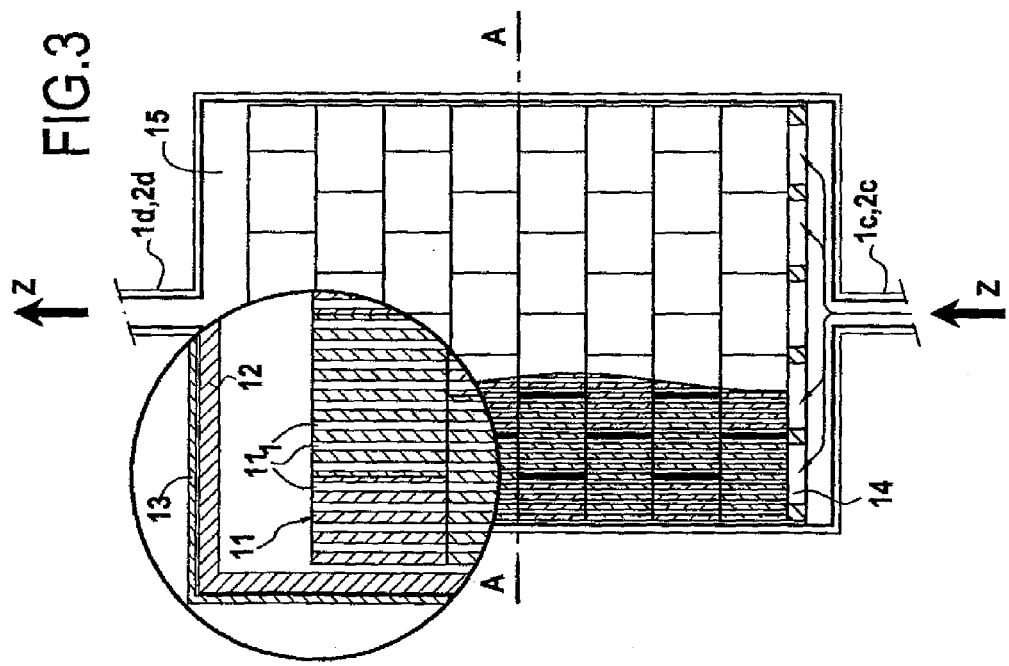

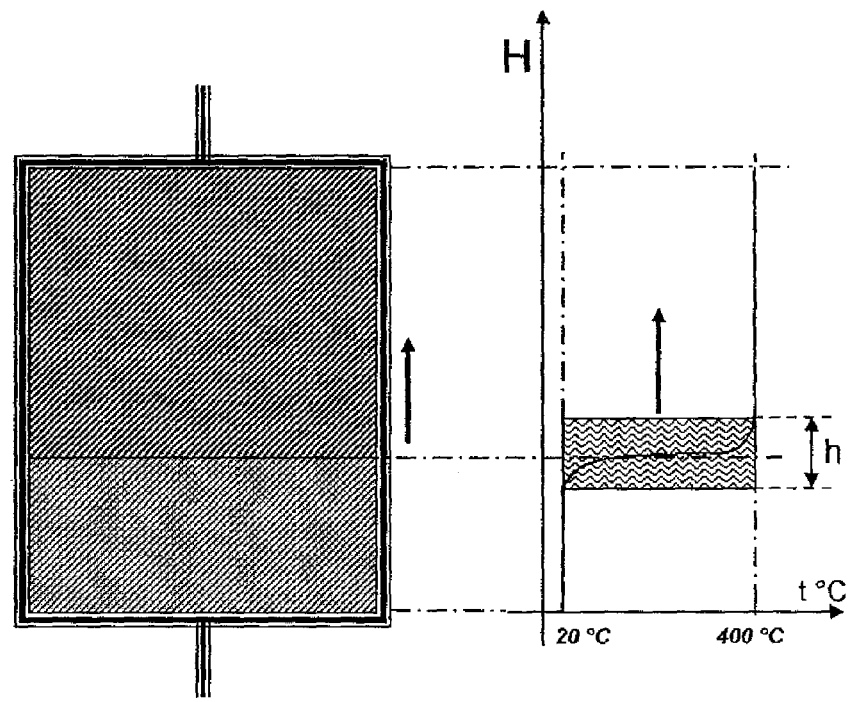
FIG.7
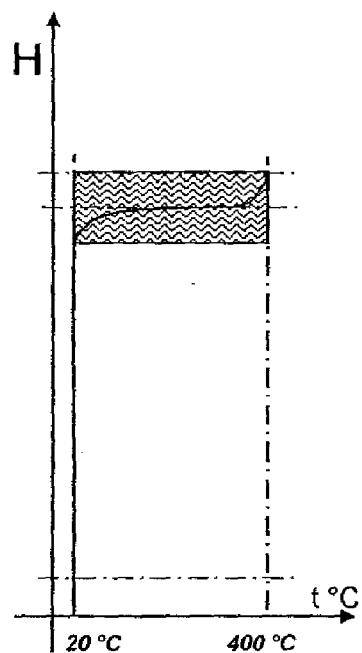 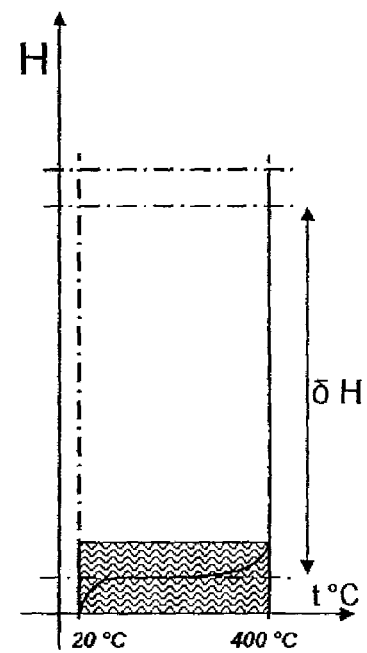
FIG.7A         FIG.7B

INSTALLATION AND METHODS FOR STORING AND METHODS FOR STORING AND RESTORING ELECTRICAL ENERGY USING A PISTON-TYPE GAS COMPRESSION AND EXPANSION UNIT

PRIORITY CLAIM

This is a U.S. national stage of application No. PCT/FR2008/051794, filed on Oct. 3, 2008. Priority is claimed on the following application: France Application No.: 0758431 filed on Oct. 19, 2007, the content of which is incorporated here by reference.

FIELD OF THE INVENTION

The present invention relates to an installation for storing and returning electrical energy that is suitable for storing several tens, or even several hundreds of megawatt hours (MWh), and it also relates to methods of storing electrical energy in the form of heat energy in which use is made of an installation of the invention, and a method of returning electrical energy ($E_R$) from heat energy stored by a method of the invention.

The present invention relates to storing energy at high temperature and more particularly to storing electrical energy in order to return it over the electricity network during peaks of consumption.

Electricity is generally produced by power stations using a variety of fuels for producing the energy, such as gas, oil, coal, or lignite. Another means consists in using nuclear fuel to produce the heat that is then transformed into electrical energy in high pressure steam turbines.

Renewable energies are also known that contribute to a greatly varying extent to the production of electricity in various countries. Mention can be made, amongst other possibilities of: hydraulic energy from dams, wind turbines, water turbines that take energy from sea currents, and various devices that recover energy from the swell of the sea, or indeed from solar energy.

Although installations that produce electricity from fuel or from water retained by dams can operate continuously at nominal or maximum power during very long periods, renewable energies are characterized by operation that is intermittent, and incorporating renewable energy in a network generally serves to off-load only a fraction of conventional power stations, some of which can then be run at low power or even merely stopped, while waiting for a power demand from the network.

BACKGROUND OF THE INVENTION

Various techniques are known that use turbines or reciprocating engine to produce mechanical energy from fuels, such as gas or oil, which consist in compressing an oxidizer, generally air, then mixing it with a fuel and causing it to burn in a combustion chamber, and finally to recover the mechanical energy that is produced. In that type of rotary machine, maximum efficiency is sought, where maximum efficiency is a function of the inlet temperature to the expansion turbine or to the engine. The limits on operating temperature are due to the temperature behavior of the blades in the expansion turbine or of the metal portions of the various active components of the engine when using a piston engine, more particularly the valves, the cylinder head, and the head(s) of the piston(s).

Steam turbines are also known that are used in nuclear power stations for converting the energy of water that has been taken to very high temperature in the form of steam, firstly into mechanical energy, and then into electrical energy within generators that are coupled to the end of the steam turbine shaft. Such steam turbines operate in a closed circuit for the heat-conveying fluid, water in the steam phase upstream from the turbine and liquid water downstream from said turbine.

Attempts have been made for a long time to store energy so as to have energy available almost instantaneously during consumption peaks. Numerous techniques have been developed, and mention can be made, amongst others, of electrical storage batteries, generally lead-acid batteries, or pumping water up to a dam at altitude, for the purpose of driving turbines during peaks in energy demand.

Storing energy in lead-acid batteries is a valid technique for small and medium capacities, but when it is necessary to store the equivalent of a nuclear power station unit, i.e. about 1200 megawatts (MW) over periods of 24 hours (h) or 36 h, the installations required become gigantic and unrealistic in practice.

Although dams constitute an excellent means for storing energy, suitable sites are unfortunately limited in number, and in addition storing very large quantities of energy requires enormous quantities of water to be mobilized, which quantities then need to be taken from the quantities that are available, and subsequently they need to be released during periods when there is no need for such quantities of water, e.g. for irrigation, in which case the water is then lost in part. Nevertheless, several sites comprise a high reservoir and a low reservoir, generally large-capacity lakes, and when storing energy, the content of the low lake is pumped up to the high lake, to be available for driving a turbine in the opposite direction when consumption peaks require additional power to be delivered to the electricity network.

Another technique consists in storing energy in the form of compressed air, and then retransforming it into mechanical energy by piston engines, vane motors, or indeed turbines.

Patent WO 2005/108758 describes a technique of storing energy in the form of heat in an underground enclosure, the heat being generated by compressing air that is initially at atmospheric pressure and at ambient temperature, with the temperature within the underground storage being about 700° C. In that application, the gas, i.e. air, flows in an open circuit from the free atmosphere into the cavern during the storage stage, and then from the cavern to the free atmosphere during the energy return stage.

In another technical field, regenerators are commonly employed in industries that use fire, i.e. with blast furnaces, in the ceramics and terra cotta industries, in the glass-making and cement-making industries, which regenerators consist in sending hot burnt gas into large towers to heat refractory masses contained therein so as to recover the heat from the gas, before releasing said gas into the atmosphere. When the maximum temperature is reached within the refractory materials, the flow of hot gas is stopped and a reverse flow of cool air is passed through, which air becomes heated on making contact with the refractory materials prior to being directed to the inlets of furnaces, or to burners. Those arrangements enable heat losses within industrial processes that consume large amounts of energy to be reduced considerably.

The problem posed is to store electrical energy from conventional power stations, such as coal, gas, oil, or indeed nuclear power stations, in order to be able to return the energy very quickly in large quantities to the electricity network during peak periods when energy demand exceeds production capacity.

Likewise, with renewable energies, such as wind turbines or sea water turbines, the problem is to be able to store large quantities of energy during periods of strong wind or current, said energy corresponding to surplus production, in order to return said energy during a stage in which production is insufficient, i.e. when the wind or the current does not enable the energy production level to be maintained at a minimum threshold.

SUMMARY OF THE INVENTION

To do this, the present invention consists essentially in storing considerable quantities of electrical energy in the form of heat within masses of refractory materials, the fluid that enables energy to be transferred being a gas, preferably an inert gas such as argon, and then to return said stored thermal potential energy in the form of electrical energy.

More precisely, the present invention provides an installation for storing and returning electrical energy, the installation being characterized in that it comprises:

A) a first lagged enclosure filled with a first porous refractory material suitable for passing a gas flowing through said first enclosure between top and bottom ends of said first enclosure; and B) a second lagged enclosure filled with a second porous refractory material suitable for passing a gas flowing through said second enclosure between top and bottom ends of said second enclosure; and C) lagged pipes enabling the gas to flow in a closed circuit between the two enclosures, the pipes comprising first and second top pipes between the top ends of the two enclosures and first and second bottom pipes between the bottom ends of the two enclosures; and D) a gas compression and expansion unit comprising:

D1) at least one first gas compression/expansion group interposed between the top ends of said first and second enclosures to which it is connected by the first and second top pipes respectively, the group comprising a first piston suitable for being moved in translation in a first cylinder, said first gas compression/expansion group being coupled to an electric motor and an electricity generator, said first gas compression/expansion group being capable of operating:

either in compression mode, said first piston being moved in translation under drive from said electric motor powered by electrical energy for storage so as to compress in said first cylinder the gas coming from said top end of the second cylinder and send it to said top end of the first enclosure;

or else in expansion or "thermodynamic engine" mode, said piston being moved in translation by expansion in said first cylinder of the gas coming from said top end of the first enclosure to be sent to said top end of the second enclosure via said second top pipe, the movement of said first piston serving to drive said electricity generator and thus return the electrical energy ($E_R$); and D2) at least one second gas compression/expansion group interposed between the bottom ends of said first and second enclosures to which it is connected by said first and second bottom pipes respectively, the group comprising a second piston suitable for being moved in translation in a second cylinder, the movement of said second piston being coupled to the movement of said first piston in such a manner that said second gas compression/expansion group is suitable for operating:

either in expansion or "thermodynamic engine" mode when said first compression/expansion group is operating in compression mode, in order to expand the gas coming from said bottom end of the first enclosure and sending it to said bottom end of the second enclosure;

or else in compression mode when said first compression/expansion group is operating in expansion mode, to compress the gas coming from said bottom end of the second enclosure and sending it to said bottom end of the first enclosure; and E) first gas heater means suitable for heating the gas flowing in a said second top pipe between the top end of said second enclosure and said first compression/expansion group, and preferably second gas heater means suitable for heating the gas inside said second enclosure; and F) gas cooler means, preferably a heat exchanger, suitable for cooling the gas flowing in said first bottom pipe between the bottom end of the first enclosure and said second compression/expansion group.

It will be understood that the movements of the first and second pistons are coupled together so that the movement of said first piston in expansion or "thermodynamic engine" mode by expansion of the gas in the first cylinder is not fully returned to said electricity generator, since it also causes said second piston to move in compression mode for compressing the gas in the second cylinder, and vice versa, the movement of said second piston in expansion mode by expansion of the gas in the second cylinder contributes to moving said first piston in compression mode for compressing the gas in the first cylinder.

More particularly, said first and second pistons are mechanically coupled to a common crank shaft suitable for being driven in rotation by said electric motor and suitable for driving said electricity generator, the movements of said first and second pistons preferably being set to be in phase opposition at 180° C.

It can thus be understood that said first piston is at the end of its stroke as close as possible to the cylinder head of said first cylinder ("top dead-center") when said second piston is in an initial position of being as far away as possible from the cylinder head of said second cylinder ("bottom dead-center"), and vice versa.

Still more particularly, each of the first and second cylinders includes at least two valves respectively enabling gas to be admitted to and exhausted from said first and second cylinders, the opening and closing of said valves being controlled as a function of the positions of the pistons in said cylinders or as a function of the values of gas pressure in said cylinders.

More particularly, the two valves of a cylinder are caused to open and close as follows:

1) for a piston of a said compression/expansion group operating in compression mode:

1a) the admission valve is opened and the exhaust valve is closed when the piston is at top dead-center and begins to move away from the cylinder head;

1b) the admission valve is closed when the piston is at bottom dead-center and starts returning towards the cylinder head, thereby compressing the gas; and 1c) the exhaust valve is opened as soon as the pressure in the cylinder reaches the value of the pressure in the downstream enclosure;

2) for a piston of a said compression/expansion group operating in expansion mode, also referred to as "thermodynamic engine" mode:

2a) the admission valve is opened and the exhaust valve is closed when the piston is at top dead-center and is beginning to move away from the cylinder head;

2b) the admission valve is closed before the piston reaches bottom dead-center so that the value of the pressure in the cylinder is substantially equal to the pressure in the downstream chamber when the piston is at bottom dead-center and begins to return towards the cylinder head; and 2c) the exhaust valve is opened as soon as the piston reaches bottom dead-center.

In a preferred embodiment, the installation of the invention is filled with an inert gas, in particular nitrogen, and preferably argon.

As explained below, argon gas is advantageous since it acts as a gas that is permanent and inert, and therefore does not corrode the pipes, with a monatomic gas presenting the advantage of being easy to heat, and thus of having a limited compression ratio, and low cost given its abundance.

In particular embodiments, the installation presents the characteristics whereby:

said first enclosure and first porous refractory material are capable of withstanding a temperature T1 of at least 300° C., preferably of at least 300° C. to 1000° C., more preferably of 400° C. to 600° C.; and said second enclosure and second porous refractory material are capable of withstanding a temperature T2 of at least 100° C., preferably of at least 100° C. to 500° C., more preferably of 200° C. to 400° C.

Advantageously, said first cylinder is of greater volume than said second cylinder.

More particularly, said first cylinder is dimensioned to compress and to expand respectively, and to heat and to cool respectively a gas between said temperatures T1 and T2, while said second cylinder is dimensioned to compress and to expand respectively and to heat and to cool respectively a gas between a temperature T3 lying in the range −50° C. to −20° C. and ambient temperature T0.

Preferably, said refractory materials present an intrinsic heat capacity per unit volume of at least 2000 kilojoules per cubic meter per kelvin ($kJ \cdot m^{-3} \cdot K^{-1}$), and more preferably at least 2800 $kJ \cdot m^{-3} \cdot K^{-1}$.

Advantageously, said first and second porous refractory materials present porosities lying in the range 20% to 60%.

More particularly, said first and second porous refractory materials are constituted by porous bricks assembled one against another, preferably having cylindrical perforations passing therethrough that are disposed parallel in a common longitudinal direction that is the longitudinal direction of the enclosure in which they are assembled, said perforations more preferably being of a diameter in the range 2 millimeters (mm) to 20 mm.

In particular embodiments, said first and second porous refractory materials are constituted by fire clay having high contents of compounds selected from magnesia, alumina, and lime.

Refractory materials that may be mentioned are chamotte, magnesia, dolomite, mullite, and also carbon, refractory concretes, or even a natural material such as flint grit.

More particularly, said first porous refractory material is constituted by second-firing fire clay or chamotte, and said second porous refractory material is constituted by first firing fire clay.

In a particular embodiment, said first and second enclosures have respective volumes of not less than 500 cubic meters ($m^3$), and preferably lying in the range 1000 $m^3$ to 5000 $m^3$.

Advantageously, each of said first and second enclosures is constituted by a plurality of vertical steel columns having their top ends and bottom ends respectively connected to a common said top pipe and a common said bottom pipe via a top manifold and a bottom manifold respectively.

The present invention also provides a method of storing electrical energy in the form of heat energy, in which an installation of the invention is used, the method being characterized in that, after an initial step of preheating the gas of said second enclosure that is heated to a temperature $T_2$, said installation being filled with a permanent gas that is initially at ambient temperature $T_0$, the following successive steps are performed:

1) the gas leaving the top end of the second enclosure at a temperature $T_2$ is heated to a temperature $T_1$ higher than a temperature $T_2$ by being compressed in a said first compression/expansion group operating in compressor mode before being delivered to the top end of said first enclosure, in which a pressure P1 is established higher than the pressure P2 of the second enclosure, said first compression group being driven by said electric motor powered by the electrical energy that is to be stored; and 2) the gas passes right through said first enclosure between said top end and its said bottom end, and it leaves said bottom end of the first enclosure at an ambient temperature T0 or a temperature T'1 greater than T0 but less than T2; and 3) the gas is then cooled, where appropriate, to an ambient temperature T0 by said gas cooler means, preferably of the heat exchanger type, located downstream from the outlet from the bottom end of the first enclosure; and 4) the gas is then expanded through a said second compression/expansion group operating in expansion mode, to said pressure P2 of the second enclosure that is lower than the pressure P1, the gas thus being cooled to a temperature T3 lower than T0 prior to entering into said second enclosure via its bottom end; and 5) the gas is caused to flow through said second enclosure between said bottom and top ends) of the second enclosure, thereby having the effect of increasing the volume of the refractory material in the bottom portion of said second enclosure that is cooled to the temperature T3, and of decreasing the volume of its top portion that is at the temperature T2 or T'2 lower than T2 but greater than T0 and T'1, and if necessary, where appropriate, the gas leaving the end of the second enclosure at the temperature T2 is heated to the temperature T'2 with the help of second gas heater means; and 6) above steps 1) to 5) are repeated until the top portion of the first enclosure heated to the temperature T1 occupies at least 80% of the volume of said first enclosure, and the bottom portion of the second enclosure cools to a temperature T3 occupying at least 80% of the volume of the second enclosure.

It will be understood that at each step 2) when the gas reaches the temperature T1 at the top end of the first enclosure, which is initially entirely at the temperature T0, and the gas moves down from the top end towards the bottom end of the first enclosure, the gas passing through said first porous refractory material has the effect of the gas delivering heat to said first refractory material in the top portion of the first enclosure, which then becomes heated to the temperature T1, while its bottom portion that is not heated or that is heated to a smaller extent is at a temperature T'1 lying in the range T0 to T1, and in practice in the range T0 to T2. As the gas that circulates in a closed loop continues to pass through, the front, or rather the thermal transition layer, between the hot top portion and the cold bottom portion in the first enclosure moves downwards, and the top portion at the temperature T1 occupies an ever increasing volume. In parallel, in step 5), the gas penetrates into the bottom of the second enclosure at a cold temperature T3, thereby having the effect of extracting heat from said second porous refractory material and thus cooling the bottom portion of the second enclosure which passes from the temperature T2 to the temperature T3. As the gas continues to pass, the front, or rather the thermal transition layer, between the hot top portion and the cold bottom portion of the second enclosure progresses upwards and the bottom portion at the temperature T3 occupies an ever increasing volume.

The electrical energy E1 used to feed the first compression/expansion group operating in compression mode with energy is thus stored in the form of (hot) heat energy in the first enclosure and in the form of (cold) heat energy in the second enclosure, with this energy depending on the gradient T1-T3.

Preferably, storage is interrupted so that the bottom portion of the first enclosure at said temperature T'1 represents at least 10% of the volume of the first enclosure, preferably 10% to 20% of the volume of the first enclosure, and/or the top portion of the second enclosure at the temperature T2 represents less than 20%, preferably 10% to 20% of the volume of said second enclosure.

According to other particular characteristics of the present invention that are advantageous, said refractory materials used have the following properties and masses:
said temperatures T1 and T2 are such that T1/T2=1.2 to 2 and T1/T0 is greater than 1.3, preferably greater than 1.5, and also preferably less than 2.5, and P1/P2 lies in the range 2 to 4; and T1 is 300° C. to 1000° C., preferably 400° C. to 600° C., and T2 is 100° C. to 500° C., preferably 200° C. to 400° C.; and the pressure P1 lies in the range 20 to 300 bars absolute (2 MPa to 30 MPa), more particularly in the range 30 to 150 bars absolute (3 MPa to 15 MPa), and the pressure P2 lies in the range 10 to 100 bars absolute (1 MPa to 10 MPa), and more particularly in the range 20 to 50 bars absolute (2 MPa to 5 MPa); and T0 is 10° C. to 40° C. and T3 is −50° C. to −20° C., T1' lying in the range 20° C. to 100° C., where appropriate.

Advantageously, the quantity of electrical energy that is stored lies in the range 20 MWh to 1000 MWh.

The present invention also provides a method of returning electrical energy from thermal energy stored by a method of the invention as defined above, the method being characterized in that, after an initial starting stage in which said first and second compression groups are driven by the said electric motor, during which initial stage said first and second groups are caused to operate respectively in expansion mode and in compression mode in such a manner as to establish a pressure gradient between the pressure P'1 in the first enclosure and a pressure P'2 less P11 in the second enclosure, P'1 preferably being greater than P1 and P'2 preferably being less than P2, the following successive steps are performed:

1) the gas leaving via the top end of the first enclosure at said temperature T1 is expanded and cooled to the temperature T2 through said first expansion/compression group operating in expansion mode and driving said electricity generator enabling returned electrical energy to be delivered; and 2) the gas passes through said second enclosure from its top end to its bottom end, a top portion of the second enclosure being heated to said temperature T2, a bottom portion of the second enclosure remaining at said temperature T3; and 3) the gas leaving the bottom end of said second enclosure at the temperature T3 is then compressed by passing through said second compression/expansion group operating in compression mode that is driven by the energy released by said first compression/expansion group operating in expansion mode so as to be heated to a temperature T4 greater than an ambient temperature T0 and where appropriate greater than T'1, but less than T2, at the outlet from said second compression/expansion group; and 4) preferably, the gas is then cooled to the ambient temperature T0 or T'1 by said cooler means prior to being introduced into said first enclosure by its bottom end to enter the bottom portion of said first enclosure which is at said temperature T'1; and 5) the gas is caused to flow through said first enclosure, thereby having the effect of increasing the volume of refractory material in the bottom portion that is at said temperature T'1 and of decreasing the volume of refractory material in the top portion that is at said hot temperature T1; and 6) above steps 1) to 5) are repeated until the bottom portion of the first enclosure at said temperature T1 represents at least 80% of the volume of the first enclosure, and the top portion of said second enclosure at said temperature T2 represents at least 80% of the volume of said second enclosure.

It will be understood that in order to maintain in the enclosures the same temperatures T1 and T2 as in the energy storage method of the invention, it is necessary, in the initial step, to establish a pressure gradient between the two enclosures that is greater than the pressure gradient between the enclosures during the storage method of the invention.

It will be understood that at each step 2), when the gas reaches the temperature T2 at the top end of the second enclosure, which is initially not more than 20% at the temperature T2 or T'2 less than T2, and the gas moves down from the top end towards the bottom end of the second enclosure, the passage of the gas through said second porous refractory material has the effect of the gas delivering heat to said second refractory material in the top portion of the second enclosure, which thus becomes heated to the temperature T2, while its non-heated bottom portion remains at the temperature T3. As the gas continues to pass through, the front, or rather the thermal transition layer, between the hot top portion and the cold bottom portion of the second enclosure moves downwards and the bottom portion at the temperature T3 occupies an ever decreasing volume. In parallel, in step 5), the gas arrives at ambient temperature T0 or at a temperature T'1 in the bottom of the first enclosure, thereby cooling said first porous refractory material and thus cooling the bottom portion of the first enclosure which goes from the temperature T1 to the temperature T'1. As the gas continues to pass through, the front, or rather the thermal transition layer, between the hot top portion and the cold bottom portion of the first enclosure moves upwards and the top portion at the temperature T1 occupies an ever decreasing volume.

The electrical energy $E_1$ stored in the form of (hot) thermal energy in the first enclosure and (cold) thermal energy in the second enclosure is thus converted into electrical energy $E_R$ from the mechanical energy released by said first compression/expansion group used during expansion and cooling of the gas from the first enclosure.

Preferably, in step 6), the energy return method is interrupted so as to maintain a top portion of the first enclosure at a said temperature T1, said top portion representing less than 20%, preferably 10% to 20% of the volume of said first enclosure, and/or a bottom portion of the second enclosure at said cold temperature T3 represents less than 20%, preferably 10% to 20%, of the volume of the second enclosure.

Advantageously, the efficiency $E_R/E_1$ with which electrical energy is returned by said electricity generator is greater than 60%, and preferably lies in the range 70% to 80%.

According to other characteristics that are advantageous of the method of returning electrical energy of the invention:
    the ratio P'1/P'2 lies in the range 2.2 to 5; and
    T4 lies in the range 30° C. to 100° C.; and
    the pressure P'1 lies in the range 60 to 400 bars absolute (6 megapascals (MPa) to 40 MPa) and P'2 lies in the range 15 to 90 bars absolute (1.5 MPa to 9 MPa).

BRIEF DESCRIPTION OF THE DRAWINGS

Other advantages and characteristics of the present invention appear in the light of the following detailed description given with reference to the following figures, in which:

FIG. 3 is a section and side view of an enclosure of an installation of the invention, including an enlargement showing cylindrical perforations;

FIGS. 3A and 3B are section views on a horizontal plane showing two variant arrangements for refractory material elements that are respectively square and hexagonal in shape;

FIGS. 7, 7A, and 7B show how a thermal transition layer of height h advances within a said first enclosure (FIG. 7) between the top and bottom ends (FIGS. 7A and 7B respectively)

Figure 1A:
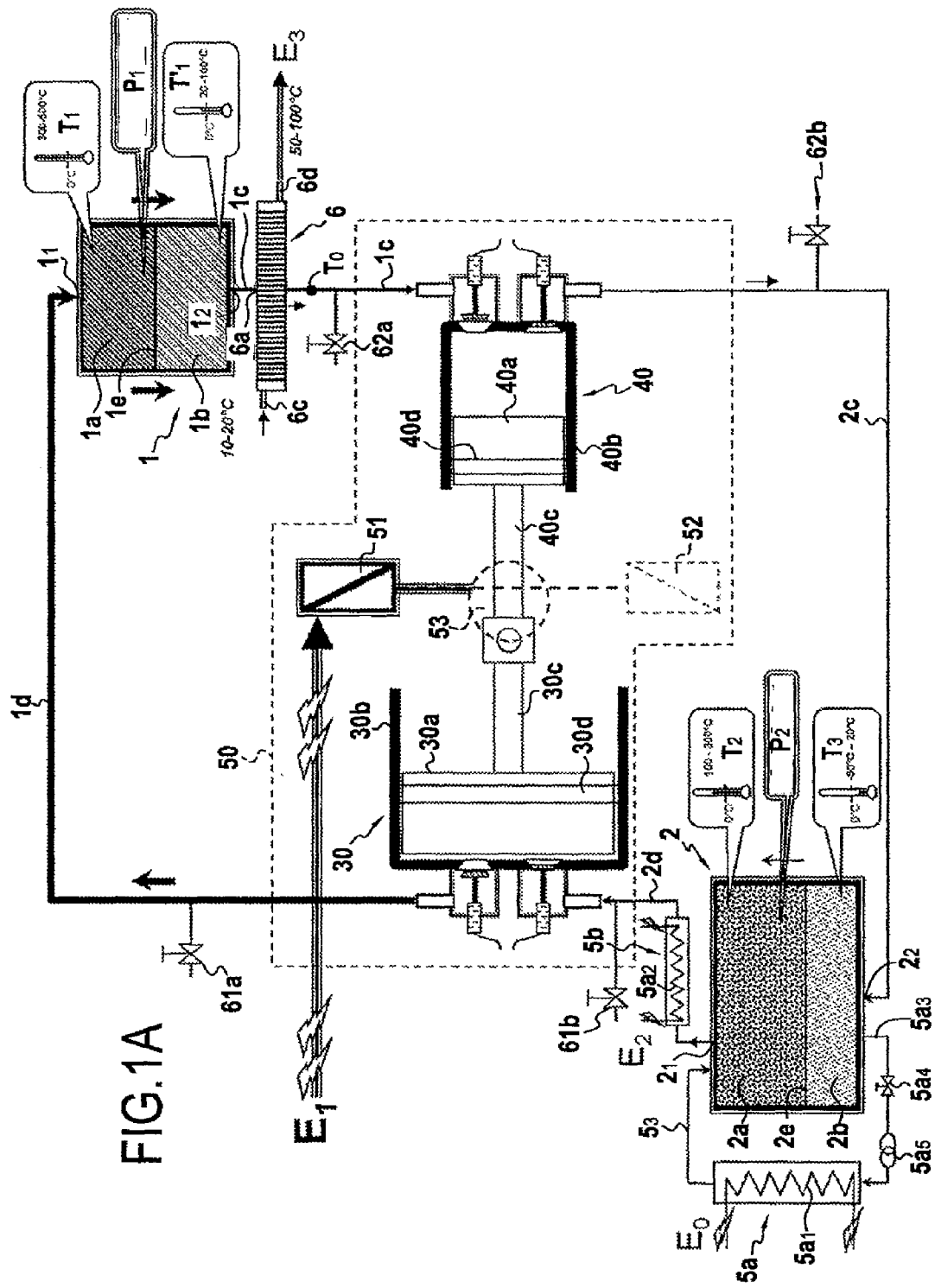
FIG. 1A is a functional diagram of an installation of the invention in an energy storage method of the invention, i.e. in a stage of recharging the first enclosure or hot source.

The device of the invention for storing electrical energy and for returning electrical energy comprises:

DETAILED DESCRIPTION OF THE PRESENTLY PREFERRED EMBODIMENTS a first lagged enclosure 1 comprising a steel wall that is 10 mm to 100 mm thick and that is filled with a first porous refractory material capable of withstanding high temperatures and pressures of an inert gas contained therein, at a temperature T1 lying in the range 300° C. to 1000° C., and more particularly of 400° C., and at a pressure P1 lying in the range 50 bars absolute (bara) to 300 bara (i.e. lying in the range 5 MPa to 30 MPa); and a second lagged enclosure 2 having the same volume, e.g. lying in the range 1000 $m^3$ to 5000 $m^3$, having a steel wall of thickness lying in the range 10 mm to 100 mm and filled with a second porous refractory material capable of withstanding the temperature T2 and the pressure P2 of the inert gas it contains, i.e. T2 lying in the range 100° C. to 500° C., and more particularly being about 250° C.

Said first and second enclosures 1 and 2 are substantially entirely filled with a porous refractory material 11 having high calorific volume as described above.

The device includes ducts for closed-circuit circulation between said first and second enclosures 1 and 2 so as to enable the gas contained in the installation to pass through each of the enclosures between two opposite ends $1_1$-$1_2$ and $2_2$-$2_2$ thereof that are preferably situated respectively at the top and bottom ends of said enclosures.

The circulation ducts between the first and second enclosures also include compression/expansion means (30 and 40) for compressing/expanding the gas between the two enclosures, as explained below.

More particularly, said first and second enclosures are disposed vertically.

In FIGS. 1A and B, the first enclosure 1 has a top duct 1d at its top end $1_1$, opening out into the top portion 1a of the first enclosure, and at its bottom end $1_2$ it has a first bottom duct 1c opening out into the bottom portion 1b of the first enclosure 1.

Similarly, the second enclosure 2 has a second top duct 2d at its top end $2_1$ opening out into the top portion 2a of the second enclosure 2, and a second bottom duct 2c at its bottom end $2_2$ opening out into the bottom portion 2b of the second enclosure 2.

Said first and second bottom ducts 1c, 2c and top ducts 1d, 2d are likewise lagged.

Said second enclosure 2 is coupled to a first heater 5a, preferably a heater comprising an electrical resistance $5a_1$ and a closed circuit of heater piping $5a_3$ between two ends of the second enclosure, the gas flowing in the heater piping $5a_3$ being heated by said first heater 5a.

A compression and expansion unit 50 is interposed between said first enclosure 1 and second enclosure 2. The compression and expansion unit 50 comprises an electric motor 51 powered with electrical energy $E_1$, serving to drive a first piston compression/expansion group 30 that is operating in compression mode, as explained below. The unit 50 also has a second piston compression/expansion group 40 coupled to the first compression/expansion group 30 and operating in complementary manner, as explained below.

Said first group 30 is connected at its outlet to the top end $1_1$ of the first enclosure 1 via said first top pipe 1d, and said first group 30 is connected at its inlet to the top end $2_1$ of said second enclosure 2 via said second top pipe 2d. Said second top pipe 2d constitutes the feed pipe of the first group 30 and said first top pipe 1d constitutes the gas exhaust pipe from the first group 30 after compression during a storage cycle and said first group operating in compression mode, as explained below.

A second heater 5b, preferably comprising a second electrical resistance $5a_2$, co-operates with said second top pipe 2d, said second heater 5b being interposed between the top end $2_1$ of the second enclosure 2 and the inlet of the first group 30.

Figure 1B:
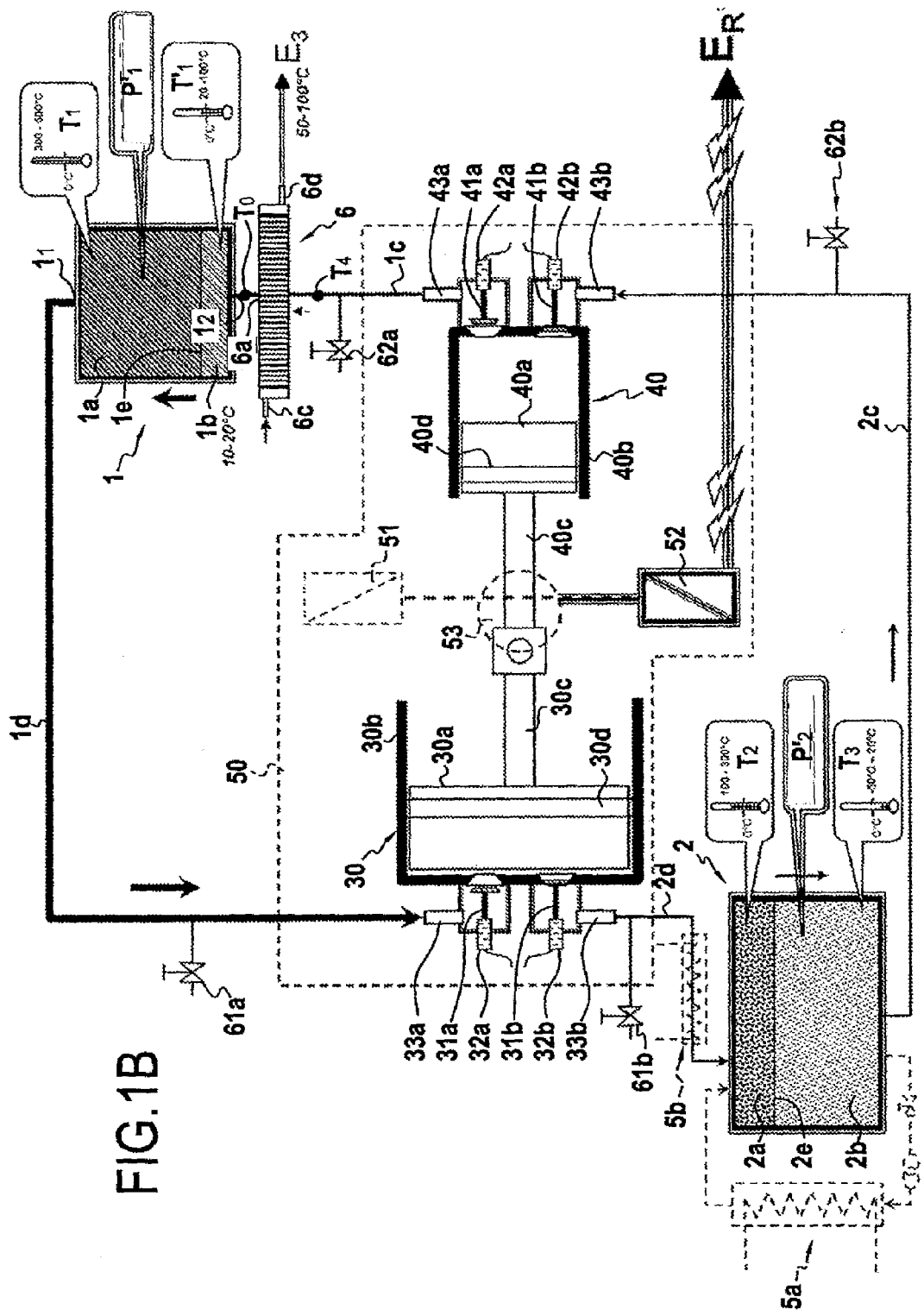
FIG. 1B is a functional diagram of the installation of the invention while returning in the form of electricity the thermal energy stored in the first enclosure or hot source.

With reference to FIGS. 1A and 1B, two heaters 5a and 5b are described as being separate, however it is entirely possible to make use of a single heater providing the routing of the ducts is adapted appropriately.

A second compression/expansion group 40 is connected to the bottom end $1_2$ of said first enclosure 1 by said first bottom pipe 1c, and said second compression/expansion group 40 is connected to the bottom end $2_2$ of said second enclosure 2 via said second bottom pipe 2c. Said first bottom pipe 1c serves to feed the second compression/expansion group 40 with gas taken from the bottom portion 1*b* of the first enclosure 1, and the gas leaving said second compression/expansion group 40 goes to the bottom portion 2*b* of said second enclosure 2 via said second bottom pipe 2*c* when the device is operating in a storage cycle and said second group is operating in expansion mode or in "thermodynamic engine mode" as explained below.

A heat exchanger 6 co-operates with said first bottom pipe 1*c* between the bottom end $1_2$ of said first enclosure 1 and said second compression/expansion group 40.

The unit 50 also has an alternator 52 for generating electricity coupled to said first compression/expansion group 30 so as to return electrical energy $E_R$ when said first compression/expansion group is operating in expansion mode or "thermodynamic engine" mode, as explained below, during an energy withdrawal cycle.

The first compression/expansion group 30 is fed with gas via said first top duct 1*d* that provides the connection with the top end $1_1$ of the first enclosure 1. And the expanded gas leaving said first compression/expansion group 30, when the device is operating in a withdrawal cycle, is exhausted to the top end $2_1$ of the second enclosure 2 via the second top duct 2*d*, thereby providing the connection with the top end $2_1$ of the second enclosure.

Said second group 40 is fed with gas by said second bottom duct 2*c*, thereby providing its connection with the bottom end $2_2$ of the second enclosure. The gas is exhausted from said second group 40 towards the bottom end $1_2$ of said first enclosure 1 via said first bottom duct 1*c*.

FIGS. 2A to 2D show in detail the operations of the first and second groups 30 and 40 during an energy storage cycle.

The electric motor 51 is connected to a crank shaft 53, itself connected to a generator 52, said crank shaft driving a first group 30 acting as a compressor during an energy storage stage and as a thermodynamic engine in an energy return stage. Said crank shaft is also connected to said second group 40 acting as a thermodynamic engine in an energy storage stage and as a compressor in an energy return stage.

The first group 30 is constituted by a first cylinder 30*b* in which a first piston 30*a* moves axially, the first piston preferably being provided with piston rings 30*d* and being connected in conventional manner by a first connecting rod 30*c* to the crank pin (not shown) of said crank shaft 53. The first cylinder head 34 is fitted with two first valves 31*a*-31*b* that are actuated in conventional manner either mechanically, electrically, or hydraulically by first actuators 32*a*-32*b* so as to put the inside volume of the cylinder into communication with the respective orifices 33*a*-33*b* in respective sequences of the compression cycle while storing energy, or expansion thermodynamic cycle while returning energy.

In the same manner, the second group 40 is constituted by a second cylinder 40*b* in which a second piston 40*a* moves axially, the second piston preferably having piston rings 40*d*, and being connected in conventional manner by a second connecting rod 40*c* to the crank pin (not shown) of said crank shaft 53. The second cylinder head 44 is fitted with second valves 41*a*-41*b* actuated in conventional manner either mechanically, electrically, or hydraulically by second actuators 42*a*-42*b* so as to put the inside volume of the cylinder into communication with the respective orifices 43*a*-43*b* in respective sequences of the expansion thermodynamic cycle during energy storage or of the compression cycle when returning energy.

The first and second cylinders move in translation in a manner known to the person skilled in the art respectively in first and second cylinders that are provided with respective first and second cylinder heads, which cylinder heads are fitted with said admission/exhaust valves controlled in manner known to the person skilled in the art either mechanically, electrically, or hydraulically to implement the sequences that are described in greater detail below. The two pistons 30*a* and 40*a* are mounted in phase opposition, i.e. at 180° on the crank shaft 53. Thus, when the crank shaft 53 rotates, the first and second pistons move in translation along the axes of their respective cylinders in such a manner that when one of the pistons is approaching its own cylinder head, the opposite piston is moving away from its own cylinder head.

Said crank shaft is connected firstly to an electric motor 51 and secondly to a generator 52 in such a manner that during the energy storage stage, the electric motor 51 is actuated by electrical energy $E_1$ coming from the network, with the generator 52 then being disconnected from said network, while in an active stage of returning energy, the electric motor 51 is disconnected from the network and the generator 52 produces the electrical energy $E_R$ that it reinjects into said network.

Each of said cylinder heads has at least two valves, an admission valve and an exhaust valve, which valves are actuated individually, either mechanically, electrically, or hydraulically, in a particular sequence that depends on the type of cycle: an energy charging cycle or an energy returning cycle.

In the charging cycle, the first group 30 acts as a compressor with the second group 40 acting as a thermodynamic engine, thereby returning energy to said first group 30 acting as a compressor. In contrast, during an energy restoring cycle, the roles are inverted and the second group 40 acts as a compressor, the first group 30 acting as a thermodynamic engine and returning energy to said second group 40 acting as a compressor.

The compressor of the invention presents a set of at least two valves acting respectively as an admission valve and as an exhaust valve.

Thus, during operation of a first or second group in a "compressor" mode, the valves are controlled individually so as to allow "low pressure-low temperature" gas to penetrate into the cylinder while the piston is moving away from the cylinder head, by actuating the first valve, with the second valve remaining hermetically closed, and allowing "high pressure—high temperature" gas to escape when the piston is moving towards the cylinder head, by actuating the second valve with the first valve being hermetically closed. The compression cycle takes place over one revolution of the crank shaft. During the compression cycle, in order to avoid gas returning from the downstream duct towards the compression chamber, the opening of the exhaust valve is advantageously synchronized with the rise of pressure in said chamber, i.e. it is not opened until the pressure inside said chamber is at least equal to the pressure downstream. Similarly, the closure of the exhaust valve is actuated rapidly as soon as the piston is as close as it comes to the cylinder head and is beginning to move in the opposite direction, the admission valve then being actuated to allow gas to pass from the upstream duct.

The groups 30 and 40 in expansion mode or thermodynamic engine mode operate in similar manner over a cycle corresponding to one revolution of the crank shaft, but the way the valves are actuated is inverted relative to when operating in compressor mode.

Thus, when the groups 30 and 40 are operating in expansion mode or "thermodynamic engine" mode, the valves are controlled individually so as to allow the "high pressure—high temperature" gas to penetrate into the cylinder as the piston is moving away from the cylinder head, by actuating the first valve, with the second valve then being hermetically closed, and to allow the "low pressure—low temperature" gas to escape when the piston is approaching the cylinder head, by actuating the second valve, the first valve then being hermetically closed. The "thermodynamic engine" cycle takes place over one revolution of the crank shaft.

The first group operates at high temperature between T1 and T2 both in compressor mode when storing energy and in thermodynamic engine mode when withdrawing energy, and it presents large cylinder capacity.

The second operates at low temperature between T3 and T0 or T'1, both in thermodynamic engine mode while storing energy and in compressor mode while withdrawing energy, and it presents cylinder capacity that is smaller than that of the first group.

In FIGS. 2A to 2D, there can be seen in section and in side view one complete cycle of the device corresponding to one complete revolution of the crank shaft in the storage stage, i.e. the left piston is acting as a compressor while the right piston is acting as a thermodynamic engine.

Figure 2A:
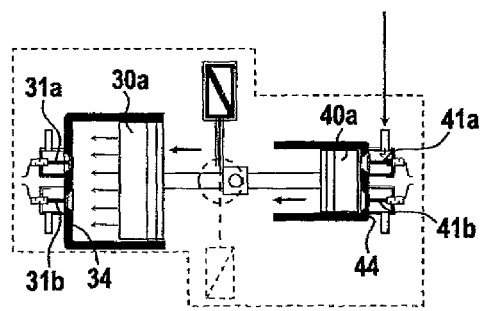
FIGS. 2A to 2D show different stages of an operating cycle of first and second compression/expansion groups 30 and 40 operating respectively in compression mode and in thermodynamic engine mode in the context of an energy storage method.

In FIG. 2A:
the first piston 30a (on the left) has reached its bottom dead-center point and is beginning to go back towards the cylinder head 34, compressing gas: both valves 31a and 31b are closed, and the pressure in the cylinder increases, while simultaneously
the second piston 40a (on the right) has reached its top dead-center point and is beginning to move away from the cylinder head 44; the valve 41b is closed and the valve 41a opens so as to allow hot gas from the bottom of the first enclosure 1 to pass through.

Figure 2B:
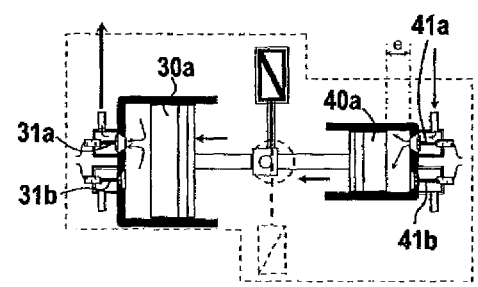

In FIG. 2B:
the valve 31b is in the closed position, the first piston 30a (on the left) is moving towards the cylinder head 34 and is compressing the gas up to pressure $P_1$ corresponding to the downstream pressure, i.e. substantially to the value of the pressure in the first enclosure. The valve 31a is then open so as to direct the gas towards the downstream duct, and simultaneously
the valve 41b is closed, with the second piston 40a (on the right) moving away from the cylinder head 44, and the gas coming from the first enclosure continuing to penetrate into the second cylinder via the valve 41a in the open position until the second piston on the right has traveled along a stroke of length e in the second cylinder.

Figure 2C:
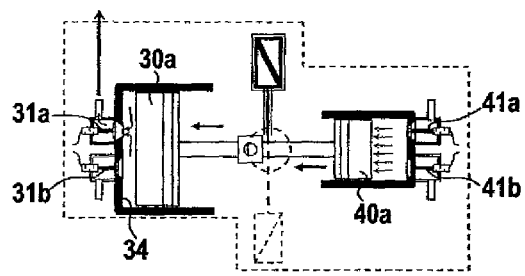

In FIG. 2C:
when the second piston (on the right) has traveled along the stroke e, the valve 41a is closed. With the valve 41b remaining closed, the hot gas expands and delivers energy to the system, said energy being transferred directly to the first piston (on the left), which is still in the compression stage;
the distance e is calculated and adjusted in real time in such a manner that when the second piston on the right is at bottom dead-center, the pressure inside said second cylinder is substantially equal to the pressure that exists in the second enclosure ($P_2$).

Figure 2D:
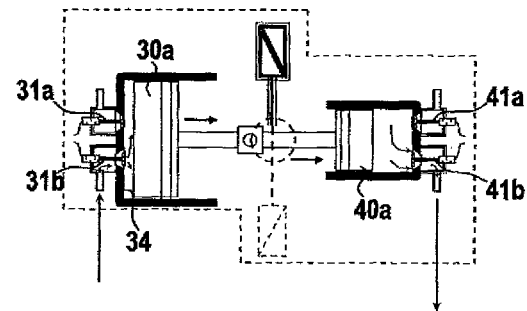

In FIG. 2D:
the second piston (on the right) has reached its bottom dead-center point, the second piston then going back towards the cylinder head, the valve 41b then being opened so as to direct the gas to the bottom of the second enclosure 2;
similarly, the first piston (on the left) reaches its top dead-center point and the valve 31a is closed, and then the valve 31b is opened immediately so as to allow gas from the top of the second enclosure 2 to enter.

The cycle then restarts as explained with reference to FIG. 2A. It should be observed that the value of e that triggers closure of the valve 41a is not associated with the pressure value $P_1$ that triggers opening of the valve 31a.

During the above-described storage cycle, energy is provided essentially by the electric motor 51. The energy delivered by the thermodynamic engine (right piston) represents a very small quantity of energy, e.g. 1% to 5% of the energy delivered by the electric motor, but it is essential for reinjecting said energy into the system so as to avoid that the overall efficiency of a storage-withdrawal cycle does not collapse.

The withdrawal cycle is identical to the storage cycle, and thus symmetrical concerning the opening and closing sequences of the valves, the left piston becoming the thermodynamic engine and the right piston becoming the compressor. The thermodynamic engine then provides a very large quantity of energy, whereas the right compressor makes use of only a small fraction of that energy, e.g. 1% to 5%, with the rest of the energy then driving the generator 52, which reinjects it into the power supply network $E_R$.

When starting the withdrawal cycle, it is appropriate to launch movement of the crank shaft and thus movements of the pistons. For this purpose, since the generator is not loaded, the electric motor 51 is actuated for a short period, e.g. for 10 minutes, sufficient time for the device to reach its operating speed. The motor is then disconnected and the generator 52 is connected to the network to reinject the energy that is produced into said network.

In a preferred version of the invention, the electric motor and the generator comprise a single rotary machine, thereby simplifying mechanical implementation of the device of the invention.

For clarity of explanation, each of the first and second groups 30 and 40 is shown in FIGS. 1A and 1B as having a single piston and cylinder assembly, however the number of piston and cylinder assemblies are advantageously increased in order to increase the capacity of the unit 50. The first groups 30 may have a number of cylinders that are different from the number in the second group 40, but they remain associated with the same crank shaft, and thus with the same electric motor 51 and the same generator 52.

For high powers, it is advantageous to have a plurality of sets 50 operating in parallel. Under such circumstances, each set 50 operates simultaneously with the others in the same mode, either storage mode or withdrawal mode. Nevertheless, it is not essential for all of them to operate simultaneously: some groups may be stopped, e.g. for maintenance. The gas delivery and exhaust ducts specific to said stop group are then isolated from the system by isolation valves 61a-61b and 62a-62b shown in FIGS. 1A and 1B.

The enclosures 1 and 2 are filled with a porous refractory material 11 enabling the gas to flow right through said enclosures between their top ends $1_1$-$1_2$ and bottom ends $1_2$-$2_2$. The porous refractory materials used in the first and second enclosures may present porosity (void percentage) lying in the range 20% to 60%, thus constituting a good compromise between firstly sufficient heat exchange between the gas and the refractory materials, and secondly head loss that is sufficiently low, while conserving a speed of flow that is sufficiently high through said porous material. In operation, the device of the invention is completely filled with an inert gas, preferably argon, i.e. the above-mentioned pipe circuits, turbines, compressors, heaters, and said first and second enclosures are all filled with inert gas.

FIG. 3 is a section and side view of an enclosure comprising a gasproof metal outer casing 13 and an internal lagging system 12 disposed between the wall of the metal outer casing 13 and a stack of blocks or bricks of refractory material 11 presenting vertical channels $11_1$ in the form of perforations, preferably of circular section with a diameter lying in the range 2 mm to 15 mm, passing right through them and arranged in substantially uniform manner in each plane over the entire horizontal section of said first enclosure, as shown in detail in FIGS. 3A and 3B.

The channels $11_1$ in the various superposed blocks 11 are in alignment with one another so as to allow the gas to circulate in the longitudinal direction ZZ of the enclosure 1, 2 between the two opposite ends of the enclosure without obstacle between the channels in the various blocks that are superposed on one another in the same longitudinal direction ZZ. A highly perforated support structure 14 situated in the bottom portion of said enclosure enables the gas entering or exiting via the adjacent lagged bottom ducts 1c, 2c to be spread in substantially uniform manner over the entire section of said enclosure, thereby directing the gas in optimum manner, i.e. with minimum head losses, to the channels $11_1$ passing vertically through said blocks of refractory material 11 when feeding takes place from the bottom. Similarly, empty spaces 15 are provided in the top portions of the enclosures so as to enable the gas to be spread out well when the enclosures are fed with gas from the top. In FIG. 3, the gas enters via the bottom and leaves through the top portion of the enclosure, with this corresponding to the storage stage for the second enclosure and to the return stage for the first enclosure, as explained below.

FIG. 3A is a fragmentary horizontal section in plan view on plane AA of FIG. 3. The blocks 11 of refractory material are square and they are perforated by multiple parallel circularly cylindrical holes extending in the vertical direction ZZ perpendicular to the plane of the figure. The blocks are advantageously spaced apart from one another, e.g. by a distance e=5 mm, so that the expansion of said blocks during changes of temperature can take place without damage in the thickness of the resulting interstitial space, and also enabling said space to serve, where appropriate, as a vertical channel for passing gas from the bottom of the enclosure 2 to the top thereof. The refractory material blocks 11 are advantageously in direct contact with the wall of the enclosure via the lagging 12 of said enclosure, so as to limit any direct and uncontrolled passage of cold or hot gas in said zone. In a first version of the invention, the blocks in the successive planes of blocks of refractory material are advantageously offset from one another by half a module, i.e. the blocks are staggered by half a block, so as to ensure that the assembly is stable within said enclosure, as shown in FIG. 3. In a preferred version of the enclosure, the blocks are stacked vertically on one another over the entire height of the enclosure so as to make up mutually independent stacks that are spaced apart from one another by 5 mm to 10 mm in all directions, thus making expansion during storage-return cycles while avoiding any risk of wear in the horizontal planes AA during said storage-return cycles, as occurs when they are mounted in a staggered configuration as shown in FIG. 3.

In FIG. 3B, there can be seen refractory blocks 11a of hexagonal section, close to the insulating wall of an enclosure that is of cylindrical shape. The connection with the insulating walls takes place either by direct contact with the edge of a block, or else in the form of an insulating block 12a that is adapted to the curvature, or indeed by packing with an insulating material 12a, e.g. material of the same type as the lagging 12 of said enclosure, or indeed by a refractory block 12b of shape that matches the curvature.

The device of the invention can operate in two different modes, namely:
  a first mode with storage or charging cycles; and
  a second mode with energy return or energy withdrawal cycles.

The energy storage or charging mode operates as follows. Initially, the inert gas, such as argon or nitrogen, is loaded into the device, i.e. into both enclosures, the turbines, the compressors, and the pipework. It is at ambient temperature, e.g. T=20° C.

FIG. 1A shows the device during a stage of recharging energy or storing energy in the first enclosure 1.

Initially, the entire installation is at ambient temperature T0 lying in the range 10° C. to 20° C., with the gas contained in the enclosures and the pipework thus being at said ambient temperature T0 and both enclosures are at the same initial pressure that is associated with the loading pressure, e.g. 1 bara to 1.2 bara.

The mass of refractory material inside the second enclosure 2 is then heated to a temperature T2 of 250° C. To do this, the gas of the second enclosure is caused to circulate in a closed loop between its top and bottom ends $2_1$ and $2_2$ and it is heated outside the enclosure using the first heater 5a which heat the gas in the heater pipe $5a_3$ that forms the loop between the bottom and top ends $2_2$ and $2_1$ of the second enclosure, on the outside thereof. The gas is caused to circulate through the heater pipework $5a_3$ by a fan $5a_5$, and the first heater 5a comprises a first resistance $5a_1$. A valve $5a_4$ serves to isolate the first heater 5a when it is not in use at the end of the initial preheating, thereby avoiding undesirable transfers and recirculation of gas during a normal cycle.

When the entire mass of refractory material in the second enclosure 2 has been raised to the temperature T2 of 250° C., the valve $5a_4$ is closed and the gas is sent via the second top duct 2d into the first compressor 30 so as to heat it to a temperature T1 lying in the range 300° C. to 600° C., e.g. 400° C. at the outlet from said first group 30 in compressor mode. A pressure gradient is established between the two enclosures, the first enclosure being raised to a pressure P1 of 20 bara to 300 bara (5 MPa to 30 MPa), and the pressure P2 in the second enclosure being reduced to about 10 bara to 100 bara (2 MPa to 10 MPa) and more particularly 20 bara to 50 bara.

In the first enclosure, the top portion 1a of the refractory material thus rises towards the temperature T1 of 400° C., while the bottom portion 1b becomes established at a temperature T'1 lying in the range 20° C. to 100° C.

At the outlet from the bottom end $1_2$ of the first enclosure, the gas needs to be expanded by the second group 40 in thermodynamic engine mode so as to reestablish it at the pressure P2 of the second enclosure prior to being reintroduced into the second enclosure via the bottom thereof, expanded and cooled to a temperature T3. Insofar as the energy stored by the system is associated with the temperature gradient T1-T3, it is advantageous to keep the temperature T3 as low as possible. For this purpose, it is advantageous to cause gas to be introduced and to penetrate into the second group 40 in thermodynamic engine mode at a temperature that is as low as possible. That is why the gas is cooled from the temperature T'1 to the temperature T0 lying in the range 10° C. to 20° C. with the help of a heat exchanger 6 at the outlet from the bottom end $1_2$ of the first enclosure prior to being introduced into the first turbine 3c.

As the various gas circulation cycles progress while operating in storage mode, the top portion 1a of the refractory material in the hot first enclosure at a temperature T1 of 400° C. occupies an ever increasing volume in the enclosure, i.e. the hot gas introduced via the top end $1_1$ of the first enclosure 1 delivers heat to said refractory materials and heats an ever increasing volume of refractory material in the first enclosure. A front 1e that corresponds to a temperature transition zone is represented by a line in FIGS. 1 and 2. The hot top portion 1a at the temperature T1 and the cold bottom portion 1b at the temperature T'1 lying in the range 20° C. to 100° C. moves progressively downwards as the gas circulation cycles continue during storage. Conversely, the bottom portion 2b of the second enclosure at the temperature T3 lying in the range at least −50° C. to −20° C. occupies an ever increasing volume in the enclosure 2. The front 2e represents a line of separation that is constituted by a transition zone between the bottom portion 2b at the temperature T3 and a top portion 2a that the temperature T2, and it moves progressively upwards as the various gas circulation cycles progress.

The first group 30 in compressor mode is actuated by an electric motor 51, which consumes electrical energy E. The second group 40 in expansion mode is coupled to the first group 30 in compressor mode via their shafts, such that the second group 40 delivers energy to the first group 30 in addition to the energy delivered by the first motor 51.

During successive gas circulation cycles in energy storage mode, the temperature of the top portion 2a in the second enclosure tends to decrease to a temperature T'2 that is lower than T2, i.e. lower than 200° C., e.g. lying in the range 150° C. to 175° C.

To mitigate this drop in temperature of the top portion 2a of the second enclosure, it is advantageous to heat the gas leaving the top end $2_1$ of the second enclosure by means of a second heater 5b comprising a second resistance $5a_2$ that enables the gas flowing in the top duct 2d to be heated so as to maintain it at a temperature T2 of 200° C. before it reaches the first group 30 in compressor mode. Similarly, the motor 51 is adjusted in such a manner as to maintain the outlet temperature from the first group 30 in compressor mode at a constant temperature T1 of about 400° C.

Throughout the duration of the various energy storage cycles, the temperature of the gas at the inlet to the second heater 5b is measured and the quantity of electrical energy $E_2$ injected per second into the second heater 5b is adjusted in real time to raise the gas to a substantially constant temperature T2. The power injected into the installation during energy storage cycles thus corresponds to the electrical energy $E_1$ feeding the electric motor 51 plus the electrical energy $E_2$ feeding the second heater 5b.

As mentioned above, during energy storage cycles, it is necessary to cool the gas leaving the bottom end $1_2$ of the first enclosure so as to reduce its temperature to the temperature T0 prior to expanding it in the first turbine 3c. This is done using the heat exchanger 6. The heat exchanger 6 is fed with a cooling fluid such as cold water or air at a temperature in the range 10° C. to 20° C. as to cool the gas leaving the first enclosure at the temperature T'1 lying in the range 20° C. to 100° C. and bring it to the temperature T0 lying in the range 10° C. to 20° C. The cooling fluid from the heat exchanger 6 leaves the heat exchanger 6 at 6d at a temperature lying in the range 30° C. to 100° C. depending on the flow rate of cooling air or water. The heat exchanger 6 thus releases heat energy $E_3$ in the form of water heated to a temperature in the range 30° C. to 100° C. This heat energy $E_3$ is energy that cannot be stored in the system, but it can be recovered either in a heat pump or it can be used in industrial processes, or even for urban heating. Thus, during a complete storage cycle, $E_3$ constitutes a loss that affects the overall efficiency of the device.

In order to stabilize the system and optimize this operation during the succession of different passages from operating in storage mode to operating in energy return mode, it is preferable to interrupt storage before the entire first enclosure has been raised to the temperature T1 or the entire second enclosure has been lowered to the temperature T3.

In practice, a bottom portion 1b constituting 10% to 20% of the total volume of the first enclosure is maintained in said enclosure at the temperature T'1 lying in the range 20° C. to 100° C. In parallel, a top portion 2a of the second enclosure is maintained at the temperature T2 or close to the temperature T2, i.e. storage is interrupted when the bottom portion 2b of the second enclosure at the temperature lying in the range −50° C. to −20° C. represents 80% to 90% of the volume of the second enclosure.

This volume of 10% to 20% corresponds to the volume of the temperature transition zone of height a as described below with reference to FIG. 7.

FIG. 1B shows the cycle for returning energy stored within the first enclosure 1 in the form of electrical energy Er.

Initially, at the end of the charging stage, when the motor 51 is switched off, the gas becomes stationary and its pressure is brought into equilibrium in the two enclosures 1 and 2 at an intermediate value of 30 bara to 100 bara (3 MPa to 10 MPa).

During a stage of starting the mode of operation in energy return or withdrawal cycling, the electric motor 51 is activated that drives the first and second groups 30 and 40 that are coupled thereto so that a pressure gradient becomes established between the two enclosures 1 and 2, respectively with a pressure P'1 higher than P1 in the first enclosure 1 and a pressure P'2 lower than P2 in the second enclosure 2.

During starting, the second group 40 in compressor mode sucks gas from the second enclosure and sends it to the first enclosure, thereby increasing the pressure in said first enclosure, and thus feeding the first group 30 in thermodynamic mode with gas so as to return finally into the second enclosure and continue its circulation cycle. As soon as the first group 30 attains sufficient operating inertia in thermodynamic mode to drive the second group 40 operating in compressor mode, the electric motor 51 is switched off.

Under steady conditions, the second group 40 sucks gas from the top portion of the first enclosure and delivers it to the second enclosure while cooling and expanding the gas. In order to optimize the operation of the installation, it is desirable for the gas leaving the second group 40 to take on substantially the same temperature T2 as the temperature of the gas in the top portion of the enclosure 2 at the end of the storage cycle. To achieve this, losses in the groups 30 and 40 are such that P'1/P'2>P1/P2. In practice, P'1 lies in the range 60 bara to 400 bara and P'2 in the range 15 bara to 90 bara.

When the pressure gradient P'1/P'2 is established, the motor 51 is switched off. The gas in the bottom portion 2b of the second enclosure is at the temperature T3 lying in the range −50° C. to −20° C. which was its temperature at the end of the storage cycle. The gas is taken to the second group 40 where it is recompressed to the pressure P'1. It is simultaneously heated to the temperature T4, which temperature T4 is higher than the temperature T0 because of the losses in the second group 40. Typically, T4 lies in the range 30° C. to 100° C.

The gas at the temperature T4 greater than T0 at the outlet from the second group 40 therefore needs to be cooled to the temperature T'1 using the heat exchanger 6 prior to being delivered to the bottom end $1_2$ of the first enclosure 1, in which the bottom portion 1b is at the temperature T'1 lying in the range 20° C. to 100° C.

The cooling of the gas at the outlet from the second group 40 during the withdrawal cycle has the effect of causing heat energy E4 to be lost by heating the cooling liquid. However this cooling of the gas from the temperature T4 to T'1 makes it easier during energy storage cycles to cool the gas at the outlet from the bottom end $1_1$ of the first enclosure from the temperature T'1 to the temperature T0 downstream from the heat exchanger so that the gas reaches ambient temperature T0 on entering the second group 40 during energy storage cycles. Overall, the heat energy loss E4 during withdrawal cycles is compensated by a heat energy loss E3 in the heat exchanger 6 that is smaller than during storage cycles. The heat energies E3+E4 correspond overall to the losses from the installation associated with the gradient T4−T0 and due to losses in the first and second groups 30 and 40.

The energy $E_R$ returned by the system corresponds to the energy released by the first group 30 that drives an electrical generator-alternator 52 that enables the energy to be returned in the form of electricity. Overall, $E_R$ corresponds more precisely to the energy released by the first group 30 in thermodynamic mode minus the energy consumed by the second group 40 that is coupled thereto. Furthermore, the overall efficiency of the installation between the storage and withdrawal cycles can be written as follows:

$$E_R = E_1 + E_2 - (E_3 + E_4) - E_5$$

where $E_5$ represents the losses through the lagging of the enclosures, the ducts, the first and second groups 30 and 40, and the various accessories.

The losses E3+E4+E5 represent 20% to 40% compared with the energies $E_1 + E_2$ supplied, so the overall efficiency of the installation and the energy return method thus lie in the range 60% to 80%.

In order to optimize the energy efficiency of the installation, it is advantageous to avoid heating the first enclosure completely to the temperature T1 at the end of the storage cycle, so as to conserve a thermal transition layer in the bottom portion 1b at a temperature T0 or T'1, and to conserve a thermal transition zone in the top portion 2b of the second enclosure at the temperature T2. Similarly, during energy return cycles at the end of a cycle, withdrawal is stopped before the first enclosure has been cooled completely and the second enclosure has been heated completely so as to conserve a thermal transition layer in the top portion 1a corresponding to 10% to 20% of the volume of the enclosure that remains at the temperature T1, and corresponding a thermal transition zone in the bottom portion 2b of the second enclosure that remains at the temperature T3, this layer likewise representing 10% to 20% of the volume of the second enclosure.

This thermal transition zone in the top portion 2b of the second enclosure at the temperature T2 makes it easier to reestablish the pressure gradient P1/P2 between the two enclosures at the beginning of the cycle for returning energy corresponding to the same temperatures T1/T2 in the first/second enclosures respectively.

Keeping a thermal transition zone at one end of each of the first and second enclosures at the end of a storage cycle and at the end of a return cycle is also advantageous in terms of the overall energy efficiency of the installation. If the entire first enclosure were to be heated at the end of the storage cycle, then the gas leaving the bottom end $1_1$ of the first enclosure while heating the volume corresponding to the thermal transition layer at the bottom end of the first enclosure would leave at a temperature higher than the temperature T'1, which would require greater cooling energy E3 and therefore higher energy losses.

In parallel, if at the end of the return cycle the bottom end $2_2$ of the entire second enclosure were to be heated, the gas leaving the bottom end $2_2$ of the second enclosure would leave at a temperature higher than T3 and would arrive downstream from the heat exchanger 6 at a higher temperature T4, thereby leading to higher cooling heat loss E4 and thus to energy losses that are likewise greater.

In addition, maintaining a bottom portion 1b at the temperature T'1 at the end of storage and a top portion 2a at the temperature T2 in the second enclosure at the end of storage makes it easier to start the return cycle, which requires using the motor 51 during a shorter length of time in order to establish stable operation with temperature gradients T1 and T2 in the first and second enclosures respectively at the pressures P'1 and P'2 during return. Likewise, maintaining a hot top layer 1a at the temperature T1 in the first enclosure at the end of energy return and maintaining a cold bottom layer 2b at the temperature T3 at the end of the return cycle makes it easier to start the subsequent storage cycle by reducing the amount of electrical energy E2 that is needed to maintain the gas entering the first group 30 at the temperature T2.

The dimensioning of the first cylinder 30b and of the second cylinder 40b, is very different, the first cylinder 30b being larger than the second cylinder 40b given the gas temperatures and pressures to which they are subjected. The volume of a gas increases with temperature, so the cylinder that operates with gas inlet at a high temperature needs to be larger in size. During the storage stage, the first group 30 operates at a temperature T1 of 300° C. to 500° C., while the second group 40 operates at a temperature T3 of about −50° C. to −20° C. It should be observed that implementing a second group 40 that is small during the storage stage makes it easier for it to be driven by the first group 30. Similarly, implementing a second group 40 that is small reduces energy losses, and the energy corresponds to the energy released by the first group 30 minus the energy consumed by the second group 40. There is therefore an additional advantage in having the temperature T3 as low as possible at the inlet to the second group 40 so as to likewise reduce the consumption of energy that affects the overall energy consumption of the system.

Making use of cooling both during energy storage cycles and during energy withdrawal cycles downstream from the bottom end of the first enclosure during energy storage and upstream from the bottom end of the first enclosure during energy return, using the same heat exchanger, enables the size of the heat exchanger to be reduced compared with an embodiment in which, for example, the gas is not cooled during energy return cycles in a heat exchanger downstream from the bottom end of the first enclosure.

As successive gas circulation cycles take place during the energy return stage, the front 1e between the cold bottom portion 1b at T'1 and the hot top portion 1a at T1 in the first enclosure moves progressively upwards, while the front 2e between the hot top portion 2a at temperature T2 from the cold bottom portion 2b at temperature T3 in the second enclosure moves progressively downwards.

It should be observed that firstly the operation of the heat exchanger 6 on the gas return circuit between the second group 40 and the bottom portion of the first enclosure 1, and secondly the operation of the first group 30 are adjusted in such a manner as to maintain said temperatures T1 and T2 at respective constant values, e.g. of 1300° C. and 500° C., throughout the energy return cycle.

It should also be observed that, according to an essential original characteristic of the present invention, the temperatures T1 and T2 are constant and identical during energy storage/charging cycles and during energy return/discharging cycles.

Figure 4:
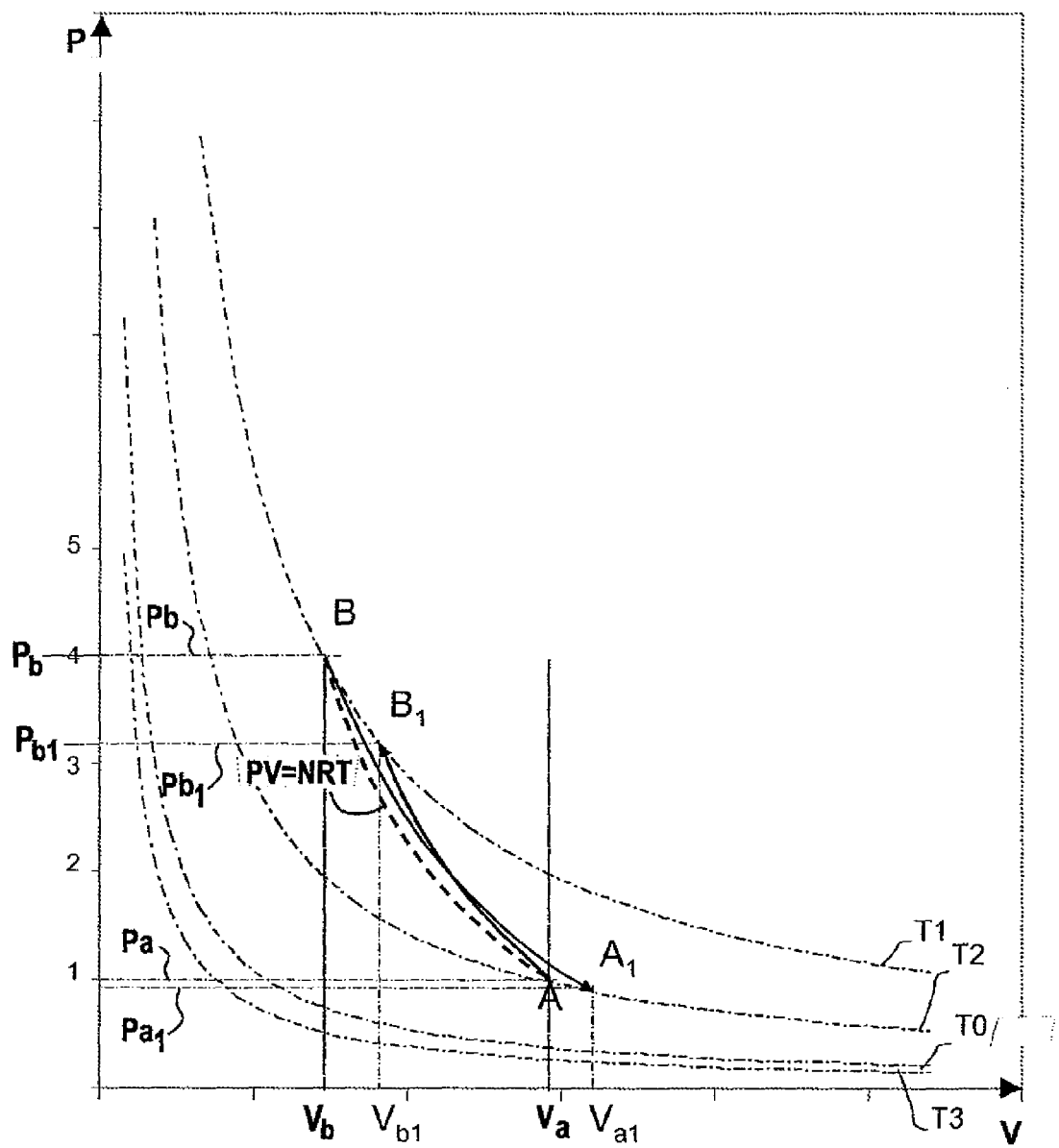
FIG. 4 shows a perfect-gas type thermodynamic cycle, and also compression and expansion of a real gas.

FIG. 4 is a graph corresponding to a thermodynamic cycle in which the abscissa axis represents volumes and the ordinate axis represents absolute pressures (bara). Four isothermals are shown corresponding respectively to:

T0 (ambient temperature 20° C.);
T1 (first enclosure temperature: 400° C.);
T2 (hot second enclosure temperature: 200° C.); and
T3 (cold second enclosure temperature: −50° C. to −20° C.)

Between points A and B, there is represented an adiabatic compression/expansion cycle for a perfect gas in application of the relationship: $PV^\gamma$=constant, between the temperatures T1 and T2. In a real machine, the behavior is different, and for adiabatic compression between T2 and T1, the curve actually followed is AB1, which shows that the temperature T1 is reached at a pressure Pb1 that is lower than Pb and at a volume Vb1 that is greater than Vb. Similarly, during adiabatic expansion, the temperature T2 is reached for a pressure Pa1 that is lower than Pa and a volume Va1 that is greater than Va.

It should be observed that for effective management of heat in both of the enclosures, it is important for the high portion of each of the gas enclosures to be at respective temperatures that are substantially identical during the storage stage and during the return stage. To explain this point, consider for example the top portion of the first enclosure. During the storage stage, the hot gas penetrates from the top into the supply of refractories. The temperature of the solids cannot exceed that of the gas but can merely come as close as possible thereto. During the return stage, the temperature of the gas leaving the top portion of the supply of refractory material in the first enclosure can at best be equal to the temperature of said refractory material. Identical remarks can be made for the second enclosure. In order to obtain the highest possible efficiency, it is important in the first enclosure for all of the heat of the gas that is injected during the storage stage to be used as well as possible during the return stage, and in the second enclosure for all of the heat recovered from the gas during the storage stage to be reused as well as possible during the return stage. In other words, it is advantageous to seek to have temperatures T1 and T2 that are as close together as possible (ideally identical) during the storage and return stages.

As mentioned above with reference to FIG. 4, if the same temperatures T1 and T2 are used during expansion or compression with real machines, then the pressure ratios are different. This means that the pressure ratios of the engine-and-compressor assemblies used during the storage and return stages need to be different. For example, from FIG. 4, during storage the high pressure is $P_{b1}$ and the low pressure $P_a$, whereas during the return stage the high pressure is $P_b$ and the low pressure $P_{a1}$.

Figure 5:
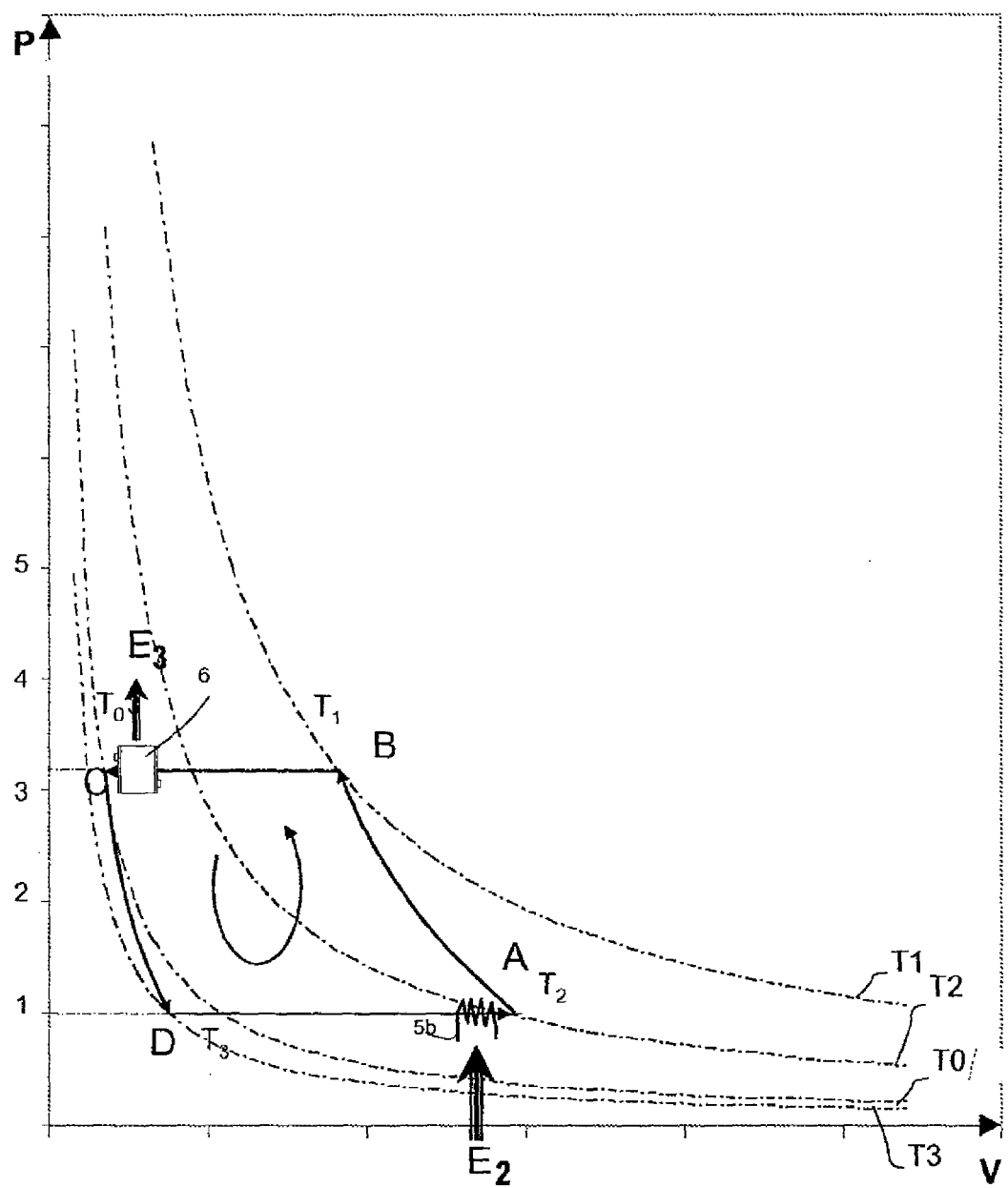
FIG. 5 shows the thermodynamic cycle for recharging the first enclosure from electrical energy taken from the network.
Figure 6:
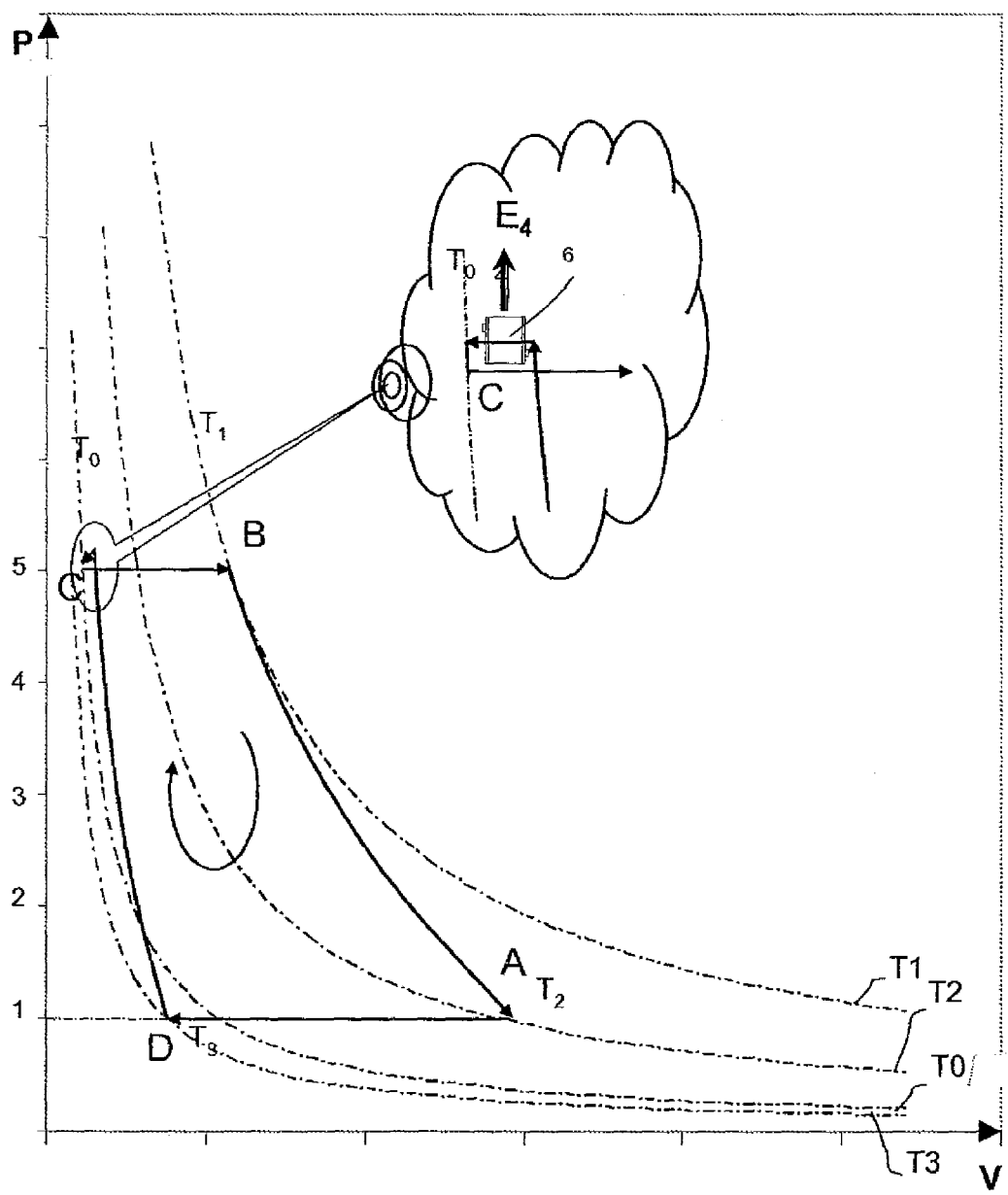
FIG. 6 shows the thermodynamic cycle for returning energy from the first enclosure for the purpose of being re-injected into the network.

FIGS. 5 and 6 show thermodynamic cycles corresponding respectively to the energy storage and return cycles that take place in the installations and methods as described with reference to FIGS. 1 and 2. These thermodynamic cycles correspond to a unit volume of gas, e.g. 1 m³, performing one complete cycle during which it acquires energy in one of the enclosures or in a compressor, and then returns it in a thermodynamic engine or in the other enclosure. Said unit volume performs this thermodynamic cycle in a length of time that is very short compared with the complete duration of a storage or return cycle, and it thus carries out hundreds or thousands or even tens of thousands of thermodynamic cycles, i.e. it passes that many times through the compressor, the thermodynamic engine, the ducts, and each of the enclosures.

FIG. 5 shows the storage stage as described with reference to FIG. 1A. The gas coming from the top portion of the second enclosure enters the first group 30 in compressor mode at the temperature T2 at point A. It is compressed and leaves at the temperature T1 at point B. It penetrates the refractory mass 11 of the first enclosure 1, passes through the refractory mass delivering heat thereto, thereby causing the temperature front to move progressively downwards. The gas leaves the bottom portion of the first enclosure at 6a at a temperature of about 20° C. to 100° C., and then passes through the heat exchanger 6 where it delivers energy E3 to the outside so as to leave said heat exchanger at a substantially constant temperature T0 corresponding to an ambient temperature of 20° C., corresponding to point C of the diagram. It then passes through the thermodynamic engine of the second group 40 where it gives off its energy to the first group 30 in compressor mode, and it leaves the second group 40 in thermodynamic engine mode in the pipe 2c at the temperature T3 (−30° C.) corresponding to point D of the diagram. Finally, it enters the low portion of the second enclosure, where it recovers heat from the refractory mass through which it flows upwards, thereby causing the temperature front E2 to rise progressively upwards. Finally, the gas leaves the second enclosure from the top thereof and is taken to the compressor 30, which it enters at the temperature T2, possibly after passing through the heater 5b where, if necessary, it receives sufficient energy E2 to readjust said gas temperature to a value T2. The gas is then returned to point A on the diagram and then undertakes a new cycle.

The thermodynamic cycle for returning energy as shown in detail on FIG. 6 takes place as follows. The gas at high temperature T1 leaves the first enclosure 1 from the top, corresponding to point B on the diagram. The gas then passes through the first group 30 in thermodynamic engine mode where it delivers energy to the generator (ER) and reaches point A on the diagram at temperature T2. Thereafter it enters the top of the second enclosure and delivers its heat to the refractory mass 11, thereby causing the temperature front 2e to move progressively downwards, and it leaves said enclosure from the bottom at a temperature T3 corresponding to point D on the diagram. The gas then passes through the second group 40 in compressor mode which it leaves at a temperature T4 higher than the desired temperature T0: it then passes through a heat exchanger 6 where it delivers the quantity of energy E4 to the outside, so as to return to the temperature T0, and thus to point C of said diagram. Finally, it penetrates into the first enclosure from the bottom where it recovers energy and heats up to reach point B of the diagram, thereby causing the temperature front 1e to rise progressively upwards, in other words cooling said first enclosure down overall.

FIG. 7 shows on the left, in section in side view, the first enclosure and the rising front 1e between the bottom zone where the temperature is about 20° C. and the top portion where the temperature is about 400° C. This rising front corresponds to a transition zone of height h as shown in greater detail by the graph on the right of FIG. 7. During the energy storage stage, the transition zone moves downwards (FIG. 7B), and during the return stage it moves upwards (FIG. 7A). In order to remain within the operating ranges of the thermodynamic engines that correspond to best efficiency, the first enclosure is advantageously neither fully charged nor fully discharged, which corresponds, as shown in detail in FIG. 7B, to limiting the charge/discharge cycle to a maximum height $\delta H_1$, e.g. corresponding to 80%-90% to the total height, and thus of the total peak capacity of said first enclosure. In like manner, a similar transition zone exists in the second enclosure, however it corresponds to different temperatures, e.g. −30° C. in the bottom portion and 200° C. in the top portion. The percentage of the calorific mass that is used then corresponds to a height δH₂, said used percentage preferably being substantially identical to that to of said first enclosure, i.e. 80%-90%.

By means of this configuration having two enclosures at different temperatures, with masses of refractory material that are used to only 80%-90% of their heat capacity, it is possible to obtain efficiency that is very good, of the order of 60% to 80%.

This is due firstly to the fact that the energy is alternately pumped and recovered between two temperature levels T2 to T1 that are both well above ambient temperature. It is known from Carnot's theorem that the efficiency of a heat engine increases with increasing temperature of its hot source.

A second reason lies in the temperatures T1 and T2 being equal during both the storage and the return stages, with this being obtained by using different turbine and compressor assemblies operating with different pressure ratios (P1/P2 and P'1/P'2).

A third reason for the good overall efficiency lies in the fact that during the storage stage, losses from the first group 30 in compressor mode are extracted in the form of heat in the gas. This energy is stored in the refractory of the first enclosure 1 just like the heat pumped from the second enclosure. This loss of energy from the hot compressor is thus recovered for the most part in the form of useful work during the return stage.

The fourth reason results from using regenerators for exchanging heat with a gas. It is possible to arrange sets of refractory parts that can operate at very high temperature and that present a very large heat exchange area between the gas and the solids. This makes it possible to approach as close as possible to equality between the temperatures T1 and T2 in both stages. The storage capacity is associated with the mass of refractory material. The disposition of the invention presents the advantage that nearly all of the refractory mass is used to perform two roles: storing heat and exchanging heat with the gas.

The final reason for good overall efficiency results from the fact that the cold produced by expansion in the first group 30 in thermodynamic engine mode during the storage stage is likewise stored in the enclosure 2. During the return stage this enables the gas to be cooled prior to it being compressed by the second group 40 in compressor mode, thereby decreasing the amount of energy absorbed by the second group 40 in compressor mode, which energy is taken from the energy that is returned E.

The power of a thermodynamic engine is given by the formula:

$$W = m \cdot Cp \cdot (T2 - T1)$$

where: m is the mass flow rate of the gas in kilograms per second (kg/s), Cp is the heat capacity of the gas in joules per kilogram per kelvin (J/kg/K), T1 is the gas inlet temperature and T2 is the gas outlet temperature. For a thermodynamic engine, T2<T1 and W is therefore negative (power is extracted from the gas). For a compressor, W is positive (power is delivered to the gas).

In the thermodynamic formula: $PV^\gamma = $ constant
$\gamma = 1.66$ for a monatomic gas;
$\gamma = 1.4$ for a diatomic gas; and
$\gamma = 1.33$ for a triatomic gas.

The temperature ratios T1, T2 depends on the pressure ratio P1, P2 or P'1, P'2, in application of the formula:

$$\frac{T1}{T2} = \left(\frac{P1}{P2}\right)^{\frac{\gamma-1}{\gamma}}$$

It can be seen that for a given temperature ratio, the pressure ratio is smaller for a monatomic gas ($\gamma = 1.66$) than for a diatomic gas ($\gamma = 1.4$), or a triatomic gas ($\gamma = 1.33$). This is of practical advantage in the design of the enclosures. The wall thickness of the enclosures is associated with the maximum pressure of the gas. In addition, since the method has the capacity to store very large quantities of energy it would use enclosures of very large dimensions. It is therefore economically advantageous to seek to minimize the internal pressure level of the gas. One simple way of achieving this result is to limit the compression ratio of the gas, for which it is preferable to select a gas that is monatomic.

Thus, the best cycle is obtained with a monatomic gas, such as helium, neon, argon, or other noble gases of high molecular mass.

Diatomic gases such as nitrogen and triatomic gases such as air or $CO_2$ are very abundant and inexpensive, but at high temperature they are aggressive to metals constituting the casing of enclosures, the pipes, or the blades of turbines and compressors, that is why it is advantageous for the gas within the device to be an inert gas that is completely inert relative to the metal elements of the device, such as helium, neon, argon or other noble gases of higher molar mass. Helium, neon, and argon are present at significant percentages in ambient air and they are available in large quantities at acceptable costs. Of these three gases, argon is the gas that gives the best performance for use in the device of the invention since it is monatomic, inert at high and very high temperatures relative to metal elements constituting the device of the invention, and it presents a molecular mass that is high together with an acquisition cost that is low.

Said first refractory material of the first enclosure is for example chamotte, also known as second-firing fire clay that withstands 1200° C., or indeed a composition having a high content of alumina and/or magnesia. The second refractory material in the second enclosure may be first-firing fire clay, refractory concrete, or a natural material such as flint grit.

As mentioned above, the refractory materials 11 are in the form of bricks that are perforated by parallel channels having a diameter of 5 mm to 20 mm and that pass right through the bricks, being disposed in such a manner as to enable gas to circulate and pass along the channels in the longitudinal direction of the enclosure.

Various types of very high temperature refractory material that are available under economically acceptable conditions are listed in the table below.

| Material | Composition | Limit T | Density kg × m⁻³ | Heat capacity (J * kg⁻¹ * K⁻¹) | Heat capacity (kJ * m⁻³ * K⁻¹) |
|---|---|---|---|---|---|
| Chamotte | Fire clay (35% $Al_2O_3$) | 1250° C. | 2000 | 1000 | 2000 |
| Magnesia | MgO | 1800° C. | 3000 | 1200 | 3600 |
| Dolomite | CaO—MgO | 1800° C. | 2700 | 1100 | 2970 |

-continued

| Material | Composition | Limit T | Density kg × m⁻³ | Heat capacity (J * kg⁻¹ * K⁻¹) | Heat capacity (kJ * m⁻³ * K⁻¹) |
|---|---|---|---|---|---|
| Mullite | 70% Al$_2$O$_3$ | 1700° C. | 2600 | 1088 | 2830 |
| Carbon | C | 2200° C. | 2200 | 1300 | 2860 |

Chamotte remains the least expensive of all these materials, but its heat capacity remains well below that of the others.

Furthermore, the energy stored in a cubic meter of refractory is given by the formula:

$$E = V \cdot Cp(T-T0)$$

where E is expressed in joules, V is the volume of hot refractory, Cp is the heat capacity in joules per cubic meter per kelvin (J/m³/K), T is the hot temperature, and T0 is the initial temperature before heating.

It can thus be seen that the higher the storage temperature T the greater the amount of energy that is stored per unit volume of refractory.

Thus, magnesia presents better performance in terms of heat capacity per unit volume with a value:

$$Cp = 3600 \, kJ * m^{-3} * K^{-1}$$

By way of example, for a device having a capacity of 3000 MWh, capable of storing and returning power at 100 MW, corresponding to charging over 40 hours and return over 30 hours is constituted:

by a first enclosure that is cylindrical having a diameter of 41 meters (m) and a height of 20 m, containing 16,500 m³ of magnesia, presenting 25% porosity, i.e., 37,000 metric tonnes (t) of refractory material; and a second enclosure having a diameter of 48 m, a height of 20 m, and containing 22,500 m³ of chamotte, presenting 35% porosity, i.e. 29,500 t of refractory material, a storage group comprising a 100 MW electric motor 51, a 117 MW compressor 30, a 17 MW turbine 40, and a return group comprising a 100 MW generator 52, a 156 MW turbine 30, and a 56 MW compressor 40. The internal volume of the complete installation, including the connection ducts, but excluding the volume corresponding to the effective mass of refractory, comes to about 35,000 m³. A fraction of the gas is confined within the insulating materials that lag the walls of the hot refractory enclosures (about 12,000 m³) and only an available volume of 23,000 m³ can participate in gas circulation. The installation is filled with argon prior to starting a pressure of 1 bar, i.e. 2 bara, which corresponds to a volume of 70,000 normalized cubic meters (Nm³), of which 46,000 Nm³ is free to circulate. During the storage stage, the pressure P1 is 3 bara in the first enclosure and the pressure P2 is 0.9 bara in the second enclosure, whereas during discharging, these pressures are respectively 3.3 bara (P'1) and 0.6 bara (P'2). The temperature T1 becomes established at 1256° C. while the temperature T2 is about 600° C. During the storage stage, the flow rate of gas to the turbine 40 or the compressor 30 is 193 normalized cubic meters per second (Nm³/s), giving a thermodynamic cycle time as shown in FIG. 5 of 238 seconds, which corresponds to 600 cycles of gas circulation for the duration of a full charge. Similar values are obtained for the discharge cycle.

The energy stored in the first and second enclosures is not lost unless the device is left inactive for a long time in terms of charging-discharging, and losses then take place to the surrounding medium, principally through the lagging 12 of said enclosures.

Since the method is essentially of advantage in storing large quantities of energy, the enclosures are relatively voluminous, which means that their surface over volume ratio is small. Heat losses for large enclosures represent only a small fraction of the energy stored. Thermal insulation is achieved with materials presenting high porosity, such as ceramic fiber felts or ceramic foams. Calculation shows that in the above-cited example, lagging presenting a thickness of 2 m using conventional fiber materials enables energy losses to be limited to less than 1% per day.

Figure 8A:
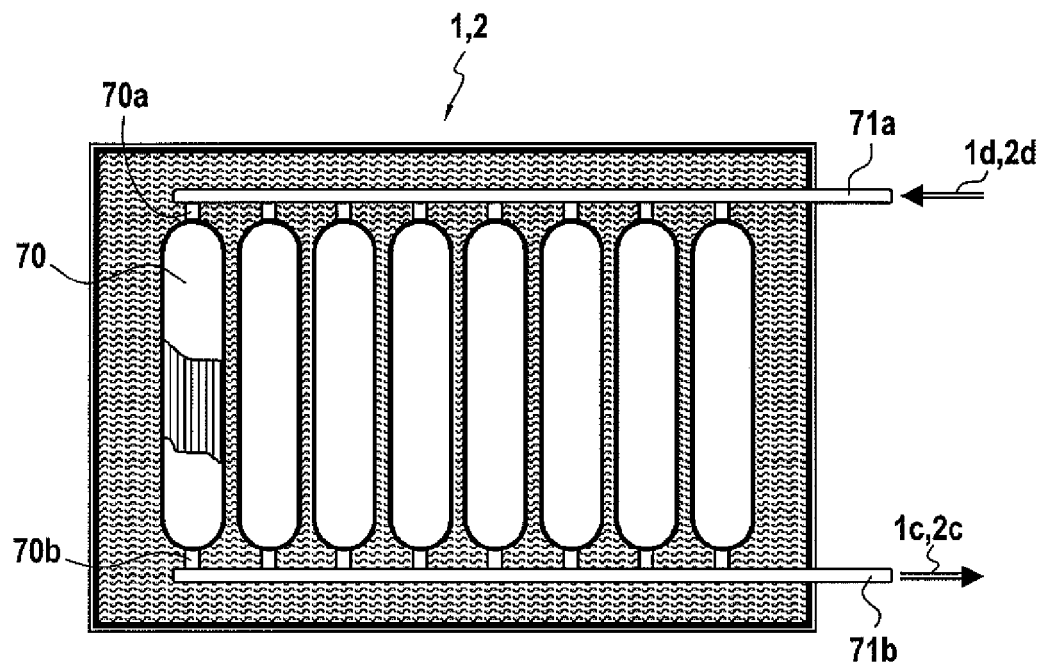
FIGS. 8A and 8B are a section view and a side view of a set of tanks in the form of vertical columns under pressure that constitute an enclosure of the invention, the insulation system being either outside said tanks as shown in FIG. 8A or inside said tanks as shown in FIG. 8B.
Figure 8B:
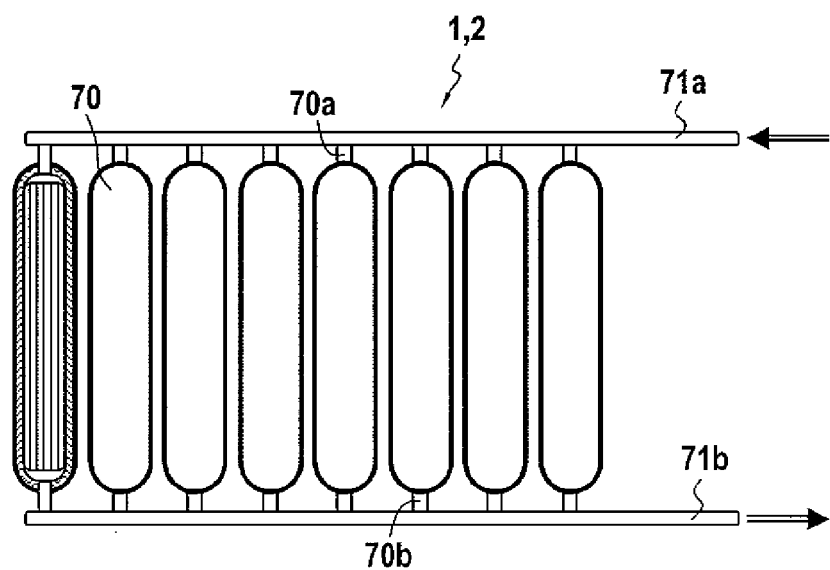

Since the level of the temperature T1 remains modest (400° C.), the enclosures 1 and 2 are advantageously made of steel, preferably using steel ducts of large diameter (1 m to 2 m). The enclosures are then constituted as a plurality of vertical ducts or columns 70 of considerable height, e.g. 12 m to 24 m, said ducts 70 being connected together as shown in FIGS. 8A and 8B. All of the columns are preferably identical in terms of diameter, height, and filling of refractory material, so that each of them presents identical head loss. They are connected together at their top ends 70a by a top manifold 71a and at their bottom ends 70b by a bottom manifold 71b. The set of columns may be insulated from the surrounding medium on the outside, as shown in FIG. 8A, or else each column may be insulated from the inside of said column, thereby significantly reducing its capacity for being loaded in refractory material, but enabling the assembly to operate at higher temperature since the steel of the high pressure tank is then substantially at ambient temperature. Advantageously, both internal and external insulation modes are coupled together, then having the effect of reducing the temperature to which the steel wall is subjected compared with the system of insulation on the outside as described above with reference to FIG. 8A.

The invention is described with the first and second gas compression/expansion groups with the travel axes of the pistons parallel. When the first piston is going towards its cylinder head, the opposite piston is going away from its cylinder head since the respective connecting rods are connected to the same crank pin: the first and second pistons are then permanently set to be in phase opposition at 180° C. However it remains within the spirit of the invention for said connecting rods to be associated with different crank pins, either in quadrature (90° C.) or in-phase (0° C.), or indeed at any other phase offset angle. Similarly, if the axial movements of the pistons are perpendicular to one another and if the connecting rods are connected to the same crank pin on the crank shaft, then the pistons are in phase quadrature (90° C.)

The preferred version of the invention is to have movement in phase opposition with the pistons moving axially and in parallel, since the work delivered by the engine piston is transferred directly to the opposite compressor piston. At a phase offset other than 180° C., the energy delivered by the engine piston is transferred in the form of rotary kinetic energy to the crank shaft and is subsequently retransferred to the compressor piston with the corresponding phase offset.

The invention claimed is:

1. An installation for storing and returning energy, the installation comprising:
   A) a first lagged enclosure filled with a first porous refractory material suitable for passing a gas flowing through said first enclosure between top and bottom ends of said first enclosure; and
   B) a second lagged enclosure filled with a second porous refractory material suitable for passing a gas flowing through said second enclosure between top and bottom ends of said second enclosure; and
   C) lagged pipes enabling the gas to flow in a closed circuit between the two enclosures, the pipes comprising first and second top pipes between the top ends of the two enclosures and first and second bottom pipes between the bottom ends of the two enclosures; and
   D) a gas compression and expansion unit comprising:
      D1) at least one first gas compression/expansion group interposed between the top ends of said first and second enclosures to which it is connected by the first and second top pipes respectively, the group comprising a first piston suitable for being moved in translation in a first cylinder, said first gas compression/expansion group being coupled to an electric motor and an electricity generator, said first gas compression/expansion group being capable of operating in at least one of:
         a compression mode, wherein said first piston is moved in translation under drive from said electric motor powered by electrical energy for storage as thermal energy so as to compress in said first cylinder the gas coming from said top end of the second cylinder and send it to said top end of the first enclosure; and
         in expansion or "thermodynamic engine" mode, wherein said piston is moved in translation by expansion in said first cylinder of the gas coming from said top end of the first enclosure to be sent to said top end of the second enclosure via said second top pipe, the movement of said first piston serving to drive said electricity generator and thus return the electrical energy; and
      D2) at least one second gas compression/expansion group is interposed between the bottom ends of said first and second enclosures to which it is connected by said first and second bottom pipes, respectively, the group comprising a second piston suitable for being moved in translation in a second cylinder, the movement of said second piston being coupled to the movement of said first piston in such a manner that said second gas compression/expansion group is suitable for operating in at least one of:
         an expansion or "thermodynamic engine" mode when said first compression/expansion group is operating in compression mode, in order to expand the gas coming from said bottom end of the first enclosure and sending it to said bottom end of the second enclosure; and
         a compression mode when said first compression/expansion group is operating in expansion mode, to compress the gas coming from said bottom end of the second enclosure and sending it to said bottom end of the first enclosure;
   E) first gas heater means suitable for heating the gas flowing in a said second top pipe between the top end of said second enclosure and said first compression/expansion group; and
   F) gas cooler means, suitable for cooling the gas flowing in said first bottom pipe between the bottom end of the first enclosure and said second compression/expansion group.

2. The energy storage and return installation according to claim 1, wherein said first and second pistons are mechanically coupled to a common crank shaft suitable for being driven in rotation by said electric motor and suitable for driving said electricity generator.

3. The energy storage and return installation according to claim 2, wherein each of the first and second cylinders includes at least two valves respectively enabling gas to be admitted to and exhausted from said first and second cylinders, the opening and closing of said valves being controlled as a function of the positions of the pistons in said cylinders or as a function of the values of gas pressure in said cylinders.

4. The energy storage and return installation according to claim 2, wherein the movements of said first and second pistons are set to be in phase opposition at 180°.

5. The energy storage and return installation according to claim 1, wherein the gas cooler means is a heat exchanger.

6. The energy storage and return installation according to claim 1, wherein it is filled with an inert gas.

7. The energy storage and return installation according to claim 6, wherein said inert gas is argon.

8. The energy storage and return installation according to claim 1, wherein:
   said first enclosure and first porous refractory material are capable of withstanding a temperature $T1$ of at least 300° C.; and
   said second enclosure and second porous refractory material are capable of withstanding a temperature $T2$ of at least 100° C.

9. The energy storage and return installation according to claim 8, wherein $T1$ is of at least 300° C. to 1000° C. and $T2$ is of at least 100° C. to 500° C.

10. The energy storage and return installation according to claim 1, wherein said first cylinder is of greater volume than said second cylinder.

11. The energy storage and return installation according to claim 1, wherein said first cylinder is dimensioned to compress and to expand respectively, and to heat and to cool respectively a gas between said temperatures $T1$ and $T2$, while said second cylinder is dimensioned to compress and to expand respectively and to heat and to cool respectively a gas between a temperature $T3$ lying in the range −50° C. to −20° C. and ambient temperature $T0$.

12. The energy storage and return installation according to claim 1, wherein said first and second porous refractory materials present porosities lying in the range 20% to 60%.

13. The energy storage and return installation according to claim 12, wherein said first and second porous refractory materials are constituted by porous bricks assembled one against another, having cylindrical perforations passing therethrough that are disposed parallel in a common longitudinal direction that is the longitudinal direction of the enclosure in which they are assembled.

14. The energy storage and return installation according to claim 1, wherein said first and second porous refractory materials are constituted by fire clay having high contents of compounds selected from magnesia, alumina, and lime.

15. The energy storage and return installation according to claim 1, wherein said first porous refractory material is constituted by second-firing fire clay or chamotte.

16. The energy storage and return installation according to claim 1, wherein said second porous refractory material is constituted by first-firing fire clay.

17. The energy storage and return installation according to claim 1, wherein said first and second enclosures have respective volumes of not less than 500 m³.

18. The energy storage and return installation according to claim 17, wherein said first and second enclosures have respective volumes in the range of 1000 m³ to 5000 m³.

19. The energy storage and return installation according to claim 1, wherein each of said first and second enclosures is constituted by a plurality of vertical steel columns having their top ends and bottom ends respectively connected to a common said top pipe and a common said bottom pipe via a top manifold and a bottom manifold respectively.

20. A method of storing electrical energy in the form of thermal energy, in which an installation according to claim 1 is used, wherein, after an initial step of preheating the gas of said second enclosure that is heated to a temperature T2, said installation being filled with a permanent gas that is initially at ambient temperature T0, the following successive steps are performed:
1) the gas leaving the top end of the second enclosure at a temperature T2 is heated to a temperature T1 higher than temperature T2 by being compressed in a said first compression/expansion group operating in compression mode before being delivered to the top end of said first enclosure, in which a pressure P1 is established higher than the pressure P2 of the second enclosure, said first compression group being driven by said electric motor powered by the electrical energy that is to be stored; and
2) the gas passes right through said first enclosure between said top end and its said bottom end, and it leaves said bottom end of the first enclosure at ambient temperature T0 or a temperature T1 greater than T0 but less than T2; and
3) the gas is then cooled, where appropriate, to ambient temperature T0 by gas cooler means, located downstream from the outlet from the bottom end of the first enclosure; and
4) the gas is then expanded through a said second compression/expansion group operating in expansion mode, to said pressure P2 of the second enclosure that is lower than the pressure P1, the gas thus being cooled to a temperature T3 lower than T0 prior to entering into said second enclosure via its bottom end; and
5) the gas is caused to flow through said second enclosure between said bottom and top ends of the second enclosure, thereby having the effect of increasing the volume of the refractory material in the bottom portion of said second enclosure that is cooled to the temperature T3, and of decreasing the volume of its top portion that is at the temperature T2 or at a temperature T'2 which is lower than T2 but greater than T0 and T'1, and where appropriate, the gas leaving the end of the second enclosure at the temperature T2 is heated to the temperature T'2 with the help of second gas heater means; and
6) above steps 1) to 5) are repeated until the top portion of the first enclosure heated to the temperature T1 occupies at least 80% of the volume of said first enclosure, and the bottom portion of the second enclosure cools to a temperature T3 occupying at least 80% of the volume of the second enclosure.

21. The method according to claim 20, wherein, in step 6), storage is interrupted so that the bottom portion of the first enclosure at said temperature T'1 represents at least 10% of the volume of the first enclosure and/or the top portion of the second enclosure at the temperature (T2) represents less than 20% of the volume of said second enclosure.

22. The method according to claim 21, wherein the bottom portion of said first enclosure at a temperature T'1 represents 10%-20% of the volume of the first enclosure, and/or the top portion of the second enclosure at a temperature T2 represents 10%-20% of the volume of said second enclosure.

23. The method according to claim 20, wherein said temperatures T1 and T2 are such that T1/T2=1.2 to 2, T1/T0 is greater than 1.3, and P1/P2 lies in the range 2 to 4.

24. The method according to claim 23, wherein T1/T0 is greater than 1.5 and less than 2.5.

25. The method according to claim 20, wherein T1 is 300° C. to 1000° C., and T2 is 100° C. to 500° C.

26. The method according to claim 18, wherein T1 is 400° C.-600° C. and T2 is 200° C.-400° C.

27. The method according to claim 23, wherein the pressure P1 lies in the range 20 to 300 bars absolute (2 MPa to 30 MPa), and the pressure P2 lies in the range 10 to 100 bars absolute (1 MPa to 10 PMa).

28. The method according to claim 23, wherein T0 lies in the range 10° C. to 40° C. and T3 lies in the range −50° C. to −20° C., while T1 is lying in the range 20° C. to 100° C.

29. The method according to claim 23, wherein the quantity of electrical energy stored lies in the range 20 MWh to 1000 MWh.

30. A method of returning electrical energy ($E_R$) from thermal energy stored by a method according to claim 20, wherein, after an initial starting stage in which said first and second compression groups are driven by the said electric motor, during which initial stage said first and second compression groups are caused to operate respectively in expansion mode and in compression mode in such a manner as to establish a pressure gradient between the pressure P'1 in the first enclosure and a pressure P'2 less P'1 in the second enclosure, P'1 being greater than P1 and P'2 being less than P2, the following successive steps are performed:
1) the gas leaving via the top end of the first enclosure at said temperature T1 is expanded and cooled to the temperature T2 through said first expansion/compression group operating in expansion mode and driving said electricity generator enabling returned electrical energy to be delivered; and
2) the gas passes through said second enclosure from its top end to its bottom end, a top portion of the second enclosure being heated to said temperature T2, a bottom portion of the second enclosure remaining at said temperature T3; and
3) the gas leaving the bottom end of said second enclosure at the temperature T3 is then compressed by passing through said second compression/expansion group operating in compression mode that is driven by the energy released by said first compression/expansion group operating in expansion mode so as to be heated to a temperature T4 greater than an ambient temperature T0 and where appropriate greater than T'1, but less than T2, at the outlet from said second compression/expansion group; and
4) the gas is then cooled to the ambient temperature T0 or T'1 by said cooler means prior to being introduced into said first enclosure by its bottom end to enter the bottom portion of said first enclosure which is at said temperature T'1; and
5) the gas is caused to flow through said first enclosure, thereby having the effect of increasing the volume of first porous refractory material in the bottom portion that is at said temperature T'1 and of decreasing the volume of refractory material in the top portion that is at said hot temperature T1; and 6) above steps 1) to 5) are repeated until the bottom portion of the first enclosure at said temperature (T1) represents at least 80% of the volume of the first enclosure, and the top portion of said second enclosure at said temperature (T2) represents at least 80% of the volume of said second enclosure.

31. The method according to claim 30, wherein, in step 6), the energy return method is interrupted so as to maintain a top portion of the first enclosure at a said temperature T1, said top portion representing less than 20%, of the volume of said first enclosure, and/or a bottom portion of the second enclosure at said cold temperature T3 represents less than 20%, of the volume of the second enclosure.

32. The method according to claim 31, wherein said top portion represents 10%-20% of the volume of said first enclosure and/or said bottom portion of the second enclosure represents 10%-20% of the volume of said second enclosure.

33. The method according to claim 30, wherein the efficiency $E_R/E_1$ with which electrical energy is returned by said electricity generator is greater than 60%.

34. The method according to claim 33, wherein the efficiency $E_R/E_1$ lies in the range of 70%-80%.

35. The method according to claim 30, wherein the ratio P'1/P'2 lies in the range 2.2 to 5.

36. The method according to claim 30, wherein T4 lies in the range 30° C. to 100° C.

37. The method according to claim 30, wherein the pressure P'1 lies in the range 60 to 400 bars absolute (6 MPa to 40 MPa) and P'2 lies in the range 15 to 90 bars absolute (1.5 MPa to 9 MPa).

* * * * *